US007099822B2

(12) United States Patent
Zangi

(10) Patent No.: US 7,099,822 B2
(45) Date of Patent: Aug. 29, 2006

(54) SYSTEM AND METHOD FOR NOISE REDUCTION HAVING FIRST AND SECOND ADAPTIVE FILTERS RESPONSIVE TO A STORED VECTOR

(75) Inventor: Kambiz C. Zangi, Durham, NC (US)

(73) Assignee: Liberato Technologies, Inc., Durham, NC (US)

( * ) Notice: Subject to any disclaimer, the term of this patent is extended or adjusted under 35 U.S.C. 154(b) by 103 days.

(21) Appl. No.: 10/916,994

(22) Filed: Aug. 12, 2004

(65) Prior Publication Data

US 2005/0251389 A1 Nov. 10, 2005

Related U.S. Application Data

(63) Continuation-in-part of application No. 10/315,615, filed on Dec. 10, 2002.

(51) Int. Cl.
*G10L 21/02* (2006.01)
*H04B 3/21* (2006.01)

(52) U.S. Cl. ...................... 704/226; 375/232; 381/71.4

(58) Field of Classification Search ..................... None
See application file for complete search history.

(56) References Cited

U.S. PATENT DOCUMENTS 5,136,577 A * 8/1992 Amano et al. .............. 370/289
5,377,276 A * 12/1994 Terai et al. .............. 381/71.11
5,400,399 A * 3/1995 Umemoto et al. ..... 379/406.08
5,416,799 A * 5/1995 Currivan et al. ............ 375/232
5,450,494 A * 9/1995 Okubo et al. ................. 381/57
5,701,349 A * 12/1997 Sano et al. ................ 381/71.4
5,768,124 A * 6/1998 Stothers et al. ............... 700/38
5,999,567 A * 12/1999 Torkkola .................... 375/232

OTHER PUBLICATIONS

: Brandstein and Ward; *System Microphone Arrays*; Spring-Verlag, 2001; Chapter 14; "Optimal and Adaptive Microphone Arrays for Speech Input in Automobiles," by Nordholm, Claesson and Grbie; pp. 307-329.

:Ljung; *Identification Theory for the User*; Prentice Hall, Inc., NJ, 1987; Chapter 6; "Nonparametric Time- and Frequency-Domain Methods," pp. 141-168.

:Oppenheim and Schafer; *Discrete-time Signal Processing*; Prentice-Hall, Englewood Cliffs, NJ 1989; Chapter 8; "The Discrete Fourier Transform;" pp. 514-561.

:Boll; *IEEE Trans. On Acoustic Speech and Signal Processing*; ASSP-27(2); Apr. 1979; "Supression of Acoustic Noise in Speech Using Spectral Subtraction;" pp. 113-120.

:Benyassine, Shlomot and Su; *IEEE Communications Magazine*; Sep. 1997; "ITU-T Recommendation G-729 Annex B: A Silence Compression Scheme for Use With G.729 Optimized for V.70 Digital Simultaneous Voice and Date Applications;" pp. 64-73.

(Continued)

*Primary Examiner*—Donald L. Storm
(74) *Attorney, Agent, or Firm*—Daly, Crowley, Mofford & Durkee, LLP

(57) ABSTRACT

A system for microphone noise reduction includes first and second filter portions and a control processor adapted to adapt the first and second filter portions in response to a one of a plurality of stored vectors. Each stored vector is representative of acoustic transfer functions in accordance with a model of a vehicle and a respective position within the vehicle. A method for processing microphone signals includes selecting a vehicle model, selecting positions within the vehicle model, measuring acoustic response vectors at the positions, storing the response vectors, selecting one of the response vectors, and adapting first and second filter portions in accordance with the selected response vector.

11 Claims, 15 Drawing Sheets

OTHER PUBLICATIONS

:Kates; *J. Acoust. Soc. Am.*, 94(4); Oct. 1993; "Superdirective Arrays for Hearing Aids;" pp. 1930-1933.

:Korompis, Wang and Yao; *Acoustics, Speech, and Signal Processing*; 1995 ICASSP-95; 1995 IEEE, vol. 4, May 9-12, 1995; "Comparison of Microphone Array Designs for Hearing Aid;" pp. 2739-2742.

:Soede, Berkhout and Bilsen; *J. Acoust. Soc. Am.*, 94(2); Aug. 1993; "Development of a Directional Hearing Instrument Based on Array Technology," pp. 785-798.

PCT Search Report: PCT/US03/38657; dated Jun. 8, 2004.

Marro et al.; "Analysis of Noise Reduction and Dereverberation Techniques Based on Microphone Arrays with Postfiltering;" IEEE Transactions on Speech and Audio Processing: New York, U.S.; vol. 6, No. 3, May 1998: XP-000785354: ISSN: 1063-6676-985; pp. 240-259.

Bizer: "Ubersicht und Analyse Mehrkanaliger Gerauschreduktionsverfahren zur Sprachkommunikation;" Universitat Bremen. Arbeitsberelch Nachrichtentechnik; 'Online:' Nov. 11, 1999; XP-002278588: URL/http://www.ant.unl-bremen.de/research/speech/Web111199.pdf: retrieved on Apr. 28, 2004, 13 pages.

Fischer et al.; "Broadband Beamforming with Adaptive Postfiltering for Speech Acquisition in Noisy Environments:" Acoustics, Speech, and Signal Processing, 1997; ICASSP-97; 1997 IEEE International Conference on Munich, Germany, Apr. 21-24, 1997, XP-010226209: ISBN: 0-8186-7919-0, pp. 359-362.

Asano et al; "Speech Enhancement Using Array Signal Processing Based on the Coherent-Subspace Method;" IEICE Trans Fundamentals; vol. E80 A. No. 11; Nov. 1, 1997; XP-000768547; ISSN: 0916-8508; pp. 2276-2285.

Kellerman: "Strategies for Combining Acoustic Echo Cancellation and Adaptive Beamforming Microphone Arrays;" 1997 IEEE Int'l Conf. on Acoustics Speech & Signal Processing, Munich, Germany; Apr. 21-24, 1997; vol. 1, Apr. 21, 1997; ISBN: 0-8186-7919-4: XP-000769157; pp. 219-222.

Dahl et al: "Simultaneous Echo Cancellation and Car Noise Suppression Employing a Microphone Array;" IEEE Int'l Conf. on Acoustics Speech & Signal Processing, Munich, Germany; Apr. 21-24, 1997; XP-10226779A; ISBN: 0-8186-7919-0/97: pp. 239-241.

PCT Search Report of the ISA for PCT/US05/25933; dated Mar. 10, 2006.

Written Opinion of the ISA for PCT/US05/25933; dated Mar. 10, 2006.

* cited by examiner

SYSTEM AND METHOD FOR NOISE REDUCTION HAVING FIRST AND SECOND ADAPTIVE FILTERS RESPONSIVE TO A STORED VECTOR

CROSS REFERENCE TO RELATED APPLICATIONS

This application is a Continuation-In-Part application of, and claims the benefit of, U.S. patent application No. 10/315,615 filed Dec. 10, 2002.

STATEMENT REGARDING FEDERALLY SPONSORED RESEARCH

Not Applicable.

FIELD OF THE INVENTION

This invention relates generally to systems and methods for reducing noise in a communication, and more particularly to methods and systems for reducing the effect of acoustic noise in a hands-free telephone system.

BACKGROUND OF THE INVENTION

As is known in the art, a portable hand-held telephone can be arranged in an automobile or other vehicle so that a driver or other occupant of the vehicle can place and receive telephone calls from within the vehicle. Some portable telephone systems allow the driver of the automobile to have a telephone conversation without holding the portable telephone. Such systems are generally referred to as "hands-free" systems.

As is known, the hands-free system receives acoustic signals from various undesirable noise sources, which tend to degrade the intelligibility of a telephone call. The various noise sources can vary with time. For example, background wind, road, and mechanical noises in the interior of an automobile can change depending upon whether a window of an automobile is open or closed.

Furthermore, the various noise sources can be different in magnitude, spectral content, and direction for different types of automobiles, because different automobiles have different acoustic characteristics, including, but not limited to, different interior volumes, different surfaces, and different wind, road, and mechanical noise sources.

It will be appreciated that an acoustic source such as a voice, for example, reflects around the interior of the automobile, becoming an acoustic source having multi-path acoustic propagation. In so reflecting, the direction from which the acoustic source emanates can appear to change in direction from time to time and can even appear to come from more than one direction at the same time. A voice undergoing multi-path acoustic propagation is generally less intelligible than a voice having no multi-path acoustic propagation.

In order to reduce the effect of multi-path acoustic propagation as well as the effect of the various noise sources, some conventional hands-free systems are configured to place the speaker in proximity to the ear of the driver and the microphone in proximity to the mouth of the driver. These hands-free systems reduce the effect of the multi-path acoustic propagation and the effect of the various noise sources by reducing the distance of the driver's mouth to the microphone and the distance of the speaker to the driver's ear. Therefore, the signal to noise ratios and corresponding intelligibility of the telephone call are improved. However, such hands-free systems require the use of an apparatus worn on the head of the user.

Other hands-free systems place both the microphone and the speaker remotely from the driver, for example, on a dashboard of the automobile. This type of hands-free system has the advantage that it does not require an apparatus to be worn by the driver. However, such a hands-free system is fully susceptible to the effect of the multi-path acoustic propagation and also the effects of the various noise sources described above. This type of system, therefore, still has the problem of reduced intelligibility.

A plurality of microphones can be used in combination with some classical processing techniques to improve communication intelligibility in some applications. For example, the plurality of microphones can be coupled to a time-delay beam former arrangement that provides an acoustic receive beam pointing toward the driver.

However, it will be recognized that a time-delay beamformer provides desired acoustic receive beams only when associated with an acoustic source that generates planar sound waves. In general, only an acoustic source that is relatively far from the microphones generates acoustic energy that arrives at the microphones as a plane wave. Such is not the case for a hands-free system used in the interior of an automobile or in other relatively small areas.

Furthermore, multi-path acoustic propagation, such as that described above in the interior of an automobile, can provide acoustic energy arriving at the microphones from more than one direction. Therefore, in the presence of a multi-path acoustic propagation, there is no single pointing direction for the receive acoustic beam.

Also, the time-delay beamformer provides most signal to noise ratio improvement for noise that is incoherent between the microphones, for example, ambient noise in a room. In contrast, the dominant noise sources within an automobile are often directional and coherent.

Therefore, due to the non-planar sound waves that propagate in the interior of the automobile, the multi-path acoustic propagation, and also due to coherency of noise received by more than one microphone, the time-delay beamformer arrangement is not well suited to improve operation of a hands-free telephone system in an automobile. Other conventional techniques for processing the microphone signals have similar deficiencies.

It would, therefore, be desirable to provide a hands-free system configured for operation in a relatively small enclosure such as an automobile. It would be further desirable to provide a hands-free system that provides a high degree of intelligibility in the presence of the variety of noise sources in an automobile. It would be still further desirable to provide a hands-free system that does not require the user to wear any portion of the system.

SUMMARY OF THE INVENTION

The present invention provides a noise reduction system having the ability to provide a communication having improved speech intelligibility.

In accordance with the present invention, system includes a first filter portion configured to receive one or more input signals and to provide a single intermediate output signal and a second filter portion configured to receive the single intermediate output signal and to provide a single output signal. The system also includes a control circuit configured to receive at least a portion of each of the one or more input signals and at least a portion of the single intermediate output signal and to provide information to adapt filter characteristics of the first and second filter portions, wherein the control circuit is configured to automatically select one of a plurality of stored vectors having vector elements. The selected one vector is used by the control processor to generate the information to adapt the filter characteristics. In one particular embodiment, each of the vector elements is associated with a transfer function between respective ones of the one or more input signal and a reference input signal.

With this particular arrangement, the system can automatically provide the plurality of stored vectors and can automatically select one of the stored vectors without intervention by a user.

In accordance with another aspect of the present invention, a system includes a first filter portion configured to receive one or more input signals and to provide a single intermediate output signal and a second filter portion configured to receive the single intermediate output signal and to provide a single output signal. The system also includes a control circuit configured to receive at least a portion of each of the one or more input signals and at least a portion of the single intermediate output signal and to provide information to adapt filter characteristics of the first and second filter portions. The system further includes at least one discrete Fourier transform (DFT) processor coupled to the first filter portion and the control circuit to receive one or more time domain signals and to provide the one or more input signals in the frequency domain to the first filter portion, and to provide the at least a portion of each of the one or more input signals in the frequency domain to the control circuit. The system also includes an interpolation processor coupled between at least one of the first filter portion and the control circuit and the second filter portion and the control circuit. The interpolation processor receives signal samples generated by the control circuit having a first frequency separation, and interpolates the signal samples. The interpolation processor provides interpolation signal samples to at least one of the first filter portion and the second filter portion, having a frequency separation less than the frequency separation of the signal samples generated by the control circuit.

With this particular arrangement, the system operates in the frequency domain and the control circuit can operate on fewer frequency samples. Therefore, processing time is reduced and the control circuit can more quickly adapt filter characteristics of the first and second filter portions.

In accordance with another aspect of the present invention, a method for processing one or more microphone signals provided by one or more microphones associated with a vehicle includes selecting a vehicle model and selecting one or more positions within a vehicle having the vehicle model. The method further includes measuring a respective one or more response vectors with an acoustic source positioned at selected ones of the one or more positions, wherein each of the one or more response vectors has respective vector elements, and wherein each one of the one or more response vectors is representative of a transfer function between a respective one of the one or more microphone signals and a reference microphone signal from among the one or more microphone signals. The method still further includes storing the one or more response vectors, selecting one of the stored response vectors; and adapting a first filter portion and a second filter portion in accordance with the selected response vector.

With this particular arrangement, the system can automatically provide stored response vectors and can automatically select one of the stored vectors without intervention by a user.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the noise reduction system in accordance with the present invention, some introductory concepts and terminology are explained.

As used herein, the notation $x_m[i]$ indicates a scalar-valued sample "i" of a particular channel "m" of a time-domain signal "x". Similarly, the notation x[i] indicates a scalar-valued sample "i" of one channel of the time-domain signal "x". It is assumed that the signal x is band limited and sampled at a rate higher than the Nyquist rate. No distinction is made herein as to whether the sample $x_m[i]$ is an analog sample or a digital sample, as both are functionally equivalent.

As used herein, a Fourier transform, $X(\omega)$, of x[i] at frequency $\omega$ (where $0 \leqq \omega \leqq 2\pi$) is described by the equation:

$$X(\omega)=\Sigma_i x[i]e^{-j\omega i}$$

As used herein, an autocorrelation, $\rho_{xx}[t]$, of x[i] at lag t, is described by the equation:

$$\rho_{xx}[t]=E\{x[i]x^*[i+t]\},$$

where superscript "*" indicates a complex conjugate, and E{ } denotes expected value.

As used herein, a power spectrum, $P_{xx}(\omega)$, of x[i] at frequency $\omega$ (where $0 \leqq \omega \leqq 2\pi$) is described by the equation:

$$P_{xx}(\omega)=\Sigma_i \rho_{xx}[i]e^{-j\omega i}$$

A generic vector-valued time-domain signal, $\vec{x}[i]$, having M scalar-valued elements is denoted herein by:

$$\vec{x}[i]=[x_1[i] \ldots x_M[i]]^T$$

where the superscript T denotes a transpose of the vector. Therefore the vector $\vec{x}[i]$ is a column vector.

The Fourier Transform of $\vec{x}[i]$ at frequency $\omega$ (where $0 \leqq \omega \leqq 2\pi$) is an M×1 vector $\vec{X}(\omega)$ whose m-th entry is the Fourier Transform of $x_m[i]$ at frequency $\omega$.

The auto-correlation of $\vec{x}[i]$ at lag t is denoted herein by the M×M matrix $\rho_{\vec{x}\vec{x}}[t]$ defined as:

$$\rho_{\vec{x}\vec{x}}[t]=E\{\vec{x}[i]\vec{x}^H[i+T]\}$$

where the superscript H represents an Hermetian.

The power spectrum of the vector-valued signal $\vec{x}[i]$ at frequency $\omega$ (where $0 \leqq \omega \leqq 2\pi$) is denoted herein by $P_{\vec{x}\vec{x}}(\omega)$ is an M×M matrix whose (i, j) entry is the Fourier Transform of the (i, j) entry of the autocorrelation function $\rho_{\vec{x}\vec{x}}[m]$ at frequency $\omega$.

Figure 1:
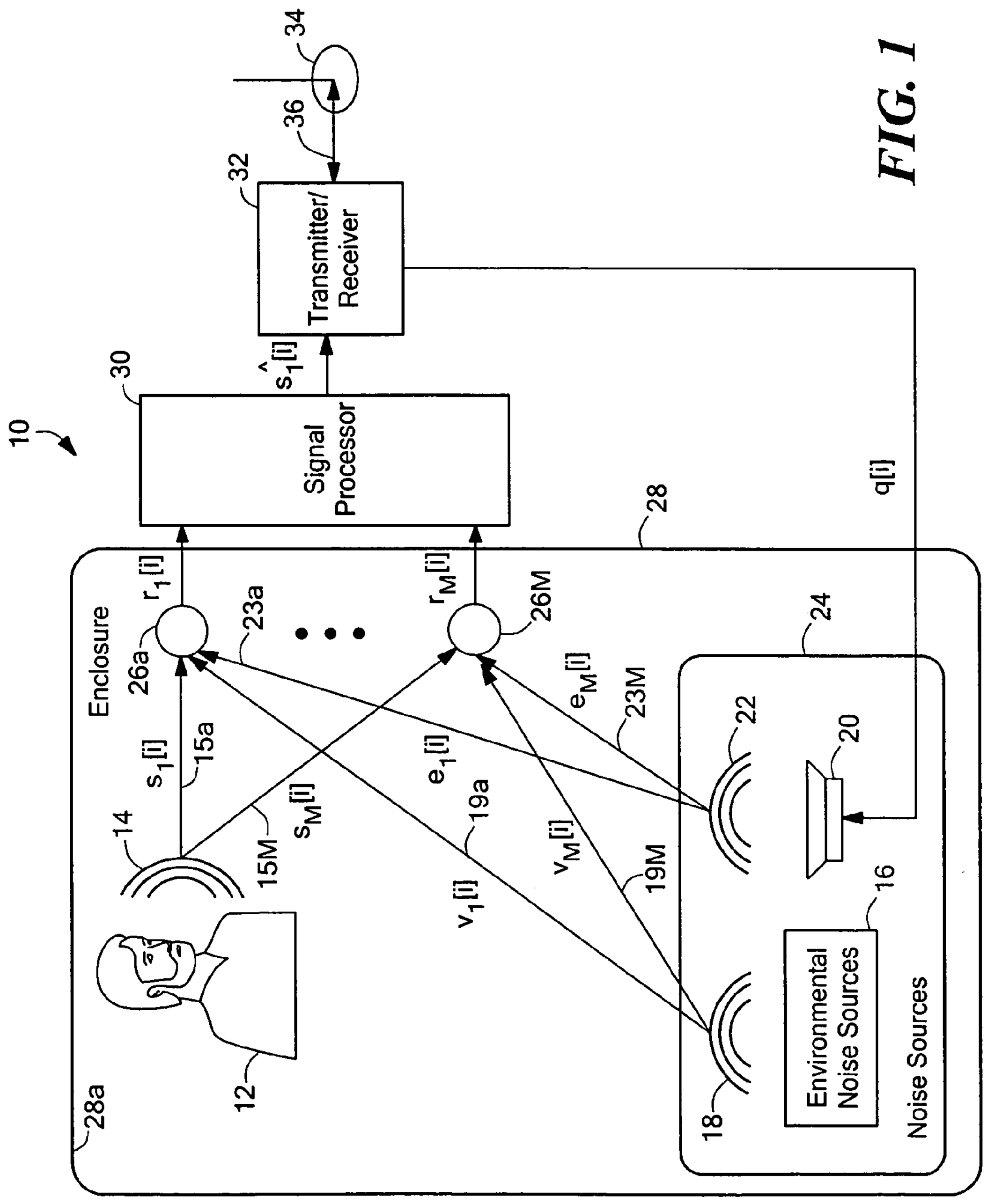
FIG. 1 is a block diagram of an exemplary hands-free system in accordance with the present invention.

Referring now to FIG. 1, an exemplary hands-free system 10 in accordance with the present invention includes one or more microphones 26*a*–26*m* coupled to a signal processor 30. The signal processor 30 is coupled to a transmitter/receiver 32, which is coupled to an antenna 34. The one or more microphones 26*a*–26M are inside of an enclosure 28, which, in one particular arrangement, can be the interior of an automobile. The one or more microphones 26*a*–26M are configured to receive a local voice signal 14 generated by a person or other signal source 12 within the enclosure 28. The local voice signal 14 propagates to each of the one or more microphones 26*a*–26M as one or more "desired signals" $s_1[i]$ to $s_m[M]$, each arriving at a respective microphone 26*a*–26M on respective paths 15*a*–15M from the person 12 to the one or more microphones 26*a*–26M. The paths 15*a*–15M can have the same length or different lengths depending upon the position of the person 12 relative to each of the one or more microphones 26*a*–26M.

A loudspeaker 20, also within the enclosure 28, is coupled to the transmitter/receiver 32 for providing a remote voice signal 22 corresponding to a voice of a remote person (not shown) at any distance from the hands-free system 10. The remote person is in communication with the hands-free system by way of radio frequency signals (not shown) received by the antenna 34. For example, the communication can be a cellular telephone call provided over a cellular network (not shown) to the hands-free system 10. The remote voice signal 22 corresponds to a remote-voice-producing signal q[i] provided to the loudspeaker 20 by the transmitter/receiver 32.

The remote voice signal 22 propagates to the one or more microphones 26*a*–26M as one or more "remote voice signals" $e_1[i]$ to $e_M[i]$, each arriving at a respective microphone 26*a*–26M upon a respective path 23*a*–23M from the loudspeaker 20 to the one or more microphones 26*a*–26M. The paths 23*a*–23M can have the same length or different lengths depending upon the position of the loudspeaker 20 relative to the one or more microphones 26*a*–26M.

One or more environmental noise sources generally denoted 16, which are undesirable, generate one or more environmental acoustic noise signals generally denoted 18, within the enclosure 28. The environmental acoustic noise signals 18 propagate to the one or more microphones 26*a*–26M as one or more "environmental signals" $v_1[i]$ to $v_M[i]$, each arriving at a respective microphone 26*a*–26M upon a respective path 19*a*–19M from the environmental noise sources 16 to the one or more microphones 26*a*–26M. The paths 19*a*–19M can have the same length or different lengths depending upon the position of the environmental noise sources 16 relative to the one or more microphones 26*a*–26M. Since there can be more than one environmental noise source 16, the environmental noise signals $v_1[i]$ to $v_M[i]$ from each such other noise source 16 can arrive at the microphones 26*a*–26M on different paths. The other noise sources 16 are shown to be collocated for clarity in FIG. 1, however, those of ordinary skill in the art will appreciate that in practice this typically will not be true.

Together, the remote voice signal 22 and the environmental acoustic noise signal 18 comprise noise sources 24 that interfere with reception of the local voice signal 14 by the one or more microphones 26*a*–26M.

It will be appreciated that the environmental noise signal 18, the remote voice signal 22, and the local voice signal 14 can each vary independently of each other. For example, the local voice signal 14 can vary in a variety of ways, including but not limited to, a volume change when the person 12 starts and stops talking, a volume and phase change when the person 12 moves, and a volume, phase, and spectral content change when the person 12 is replaced by another person having a voice with different acoustic characteristics. For another example, the remote voice signal 22 can vary in the same way as the local voice signal 14. For another example, the environmental noise signal 18 can vary as the environmental noise sources 16 move, start, and stop.

Not only can the local voice signal 14 vary, but also the desired signals 15*a*–15M can vary irrespective of variations in the local voice signal 14. In this regard, taking the microphone 26*a* as representative of all microphones 26*a*–26M, it should be appreciated that, while the microphone 26*a* receives the desired signal $s_1[i]$ corresponding to the local voice signal 14 on the path 15*a*, the microphone 26*a* also receives the local voice signal 14 on other paths (not shown). The other paths correspond to reflections of the local voice signal 14 from the inner surface 28*a* of the enclosure 28. Therefore, while the local voice signal 14 is shown to propagate from the person 12 to the microphone 26*a* on a single path 15*a*, the local voice signal 14 can also propagate from the person 12 to the microphone 26*a* on one or more other paths or reflection paths (not shown). The propagation, therefore, can be a multi-path propagation. In FIG. 1, only the direct propagation paths 15*a*–15M are shown.

Similarly, the propagation paths 19*a*–19M and the propagation paths 23*a*–23M represent only direct propagation paths and the environmental noise signal 18 and the remote signal 22 both experience multi-path propagation in traversing from the environmental noise sources 16 and the loudspeaker 20 respectively, to the one or more microphones 26*a*–26M. Therefore, each of the local voice signal 14, the environmental noise signal 18, and the remote voice signal 22 arriving at the one or more microphones 26*a*–26M through multi-path propagation, are affected by the reflective characteristics and the shape, i.e., the acoustic characteristics, of the interior 28*a* of the enclosure 28. In one particular embodiment, where the enclosure 28 is an interior of an automobile or other vehicle, not only can the acoustic characteristics of the interior of the automobile vary from automobile to automobile, but they can also vary depending upon the contents of the automobile, and in particular they can also vary depending upon whether one or more windows are up or down.

The multi-path propagation has a more dominant effect on the acoustic signals received by the microphones 26*a*–26M when the enclosure 28 is small and when the interior of the enclosure 28 is acoustically reflective. Therefore, a small enclosure corresponding to the interior of an automobile having glass windows, known to be acoustically reflective, is expected to have substantial multi-path acoustic propagation.

As shown below, equations can be used to describe aspects of the hands-free system of FIG. 1.

In accordance with the general notation $x_m[i]$ described above, the notation $s_1[i]$ corresponds to one sample of the local voice signal 14 traveling along the path 15*a*, the notation $e_1[i]$ corresponds to one sample of the remote voice signal 22 traveling along the path 23*a*, and the notation $v_1[i]$ corresponds to one sample of the environmental noise signal 18 traveling along the path 19*a*.

The $i^{th}$ sample of the output of the m-th microphone is denoted $r_m[i]$. The $i^{th}$ sample of the output of the m-th microphone may be computed as:

$$r_m[i]=s_m[i]+n_m[i],\ m=1, \ldots, M$$

In the above equation, $s_m[i]$ corresponds to the local voice signal 14, and $n_m[i]$ corresponds to a combined noise signal described below.

The sampled signal $s_m[i]$ corresponds to a "desired signal portion" received by the m-th microphone. The signal $s_m[i]$ has an equivalent representation $s_m[i]$ at the output of the m-th microphone within the signal $r_m[i]$. Therefore, it will be understood that the local voice signal 14 corresponds to each of the signals $s_1[i]$ to $s_M[i]$, which signals have corresponding desired signal portions $s_1[i]$ to $s_M[i]$ at the output of respective microphones.

Similarly, $n_m[i]$ corresponds to a "noise signal portion" received by the m-th microphone (from the loudspeaker 20 and the environmental noise sources 16) as represented at the output of the m-th microphone within the signal $r_m[i]$. Therefore, the output of the m-th microphone comprises desired contributions from the local voice signal 12, and undesired contributes from the noise 16, 20.

As described above, the noise $n_m[i]$ at the output of the m-th microphone has contributions from both the environmental noise signal 18 and the remote voice signal 22 and can, therefore, be described by the following equation:

$$n_m[i]=v_m[i]+e_m[i],\ m=1, \ldots, M$$

In the above equation, $v_m[i]$ is the environmental noise signal 18 received by the m-th microphone, and $e_m[i]$ is the remote voice signal 22 received by the m-th microphone.

Both $v_m[i]$ and $e_m[i]$ have equivalent representations $v_m[i]$ and $e_m[i]$ at the output of the m-th microphone. Therefore, it will be understood that the remote voice signal 22 and the environmental noise signal 18 correspond to the signals $e_1[i]$ to $e_M[i]$ and $v_1[i]$ to $v_M[i]$ respectively, which signals both contribute to corresponding "noise signal portions" $n_1[i]$ to $n_M[i]$ at the output of respective microphones.

In operation, the signal processor 30 receives the microphone output signals $r_m[i]$ from the one or more microphones 26*a*–26M and estimates the local voice signal 14 therefrom by estimating the desired signal portion $s_m[i]$ of one of the signals $r_m[i]$ provided at the output of one of the microphones. In one particular embodiment, the signal processor 30 receives the microphone output signals $r_m[i]$ and estimates the local voice signal 14 therefrom by estimating the desired signal portion $s_1[i]$ of the signal $r_1[i]$ provided at the output of the microphone 26*a*. However, it will be understood that the desired signal portion from any microphone can be used.

The hands-free system 10 has no direct access to the local voice signal 14, or to the desired signal portions $s_m[i]$ within the signals $r_m[i]$ to which the local voice signal 14 corresponds. Instead, the desired signal portions $s_m[i]$ only occur in combination with noise signals $n_m[i]$ within each of the signals $r_m[i]$ provided by each of the one or more microphones 26*a*–26M.

Each desired signal portion $s_m[i]$ provided by each microphone 26*a*–26M is related to the desired signal portion $s_1[i]$ provided by the first microphone through a linear convolution:

$$s_m[i]=s_1[i]*g_m[i],\ i=1, \ldots, M$$

where the $g_m[i]$ are the transfer functions relating $s_1[i]$ provided by the first microphone 26*a* to $s_m[i]$ provided by the other microphones 26*m*. These transfer function are not necessarily causal. In one particular embodiment, the transfer functions $g_m[i]$ can be modeled as a simple time delays or time advances; however, these transfer functions can be any transfer function.

Similarly, each remote voice signal $e_m[i]$ provided by each microphone 26*a*–26M as part of the signals $r_m[i]$ is related to the remote voice-producing signal $q[i]$ through a linear convolution:

$$e_m[i]=q[i]*k_m[i],\ m=1, \ldots, M$$

In the above equation, $k_m[i]$ are the transfer functions relating $q[i]$ to $e_m[i]$. The transfer functions $k_m[i]$ are strictly causal.

The above relationships have equivalent representations in the frequency domain. Lower case letters are used in the above equations to represent time domain signals. In contrast, upper case letters are used in the equations below to represent the same signals, but in the frequency domain. Furthermore, vector notations are used to represent the values among the one or more microphones 26*a*–26M. Therefore, similar to the above time-domain representations given above, in the frequency-domain:

$$\vec{R}(\omega)=\vec{S}(\omega)+\vec{N}(\omega)=\vec{G}(\omega)S_1(\omega)+\vec{N}(\omega),$$

In the above equation, $\vec{R}(\omega)$ is a frequency-domain representation of a group of the time-sampled microphone output signals $r_m[i]$, $\vec{S}(\omega)$ is a frequency-domain representation of a group of the time-sampled desired signal portion signals $s_m[i]$, $\vec{N}(\omega)$ is a frequency-domain representation of a group of the time-sampled noise portion signals $n_m[i]$, $\vec{G}(\omega)$ is a frequency-domain representation of a group of the transfer functions $g_m[i]$, and $S_1(\omega)$ is a frequency-domain representation of a group of the time-sampled desired signal portion signals $s_1[i]$ provided by the first microphone 26*a*.

$\vec{G}(\omega)$ is a matrix of size M×1 and $S_1(\omega)$ a scalar value is of size 1×1.

Similarly, in the frequency domain:

$$\vec{E}(\omega)=\vec{K}(\omega)Q(\omega)$$

In the above equation, $\vec{N}(\omega)$) is a frequency-domain representation of a group of the time-sampled signals $n_m[i]$, $\vec{K}(\omega)$ is a frequency-domain representation of a group of the transfer functions $k_m[i]$, and $Q(\omega)$ is a frequency-domain representation of a group of the time-sampled signals q[i].

$\vec{K}(\omega)$ is a vector of size M×1, and $Q(\omega)$ is a scalar value of size 1×1.

A mean-square error is a particular measurement that can be evaluated to characterize the performance of the hands-free system 10. The means square error can be represented as:

$$\mu[i]=s_1(i)-\hat{s}_1[i],$$

In the above equation, $\hat{s}_1[i]$ is an "estimate signal" corresponding to an estimate of the desired signal portion $s_1[i]$ of the signal $r_1[i]$ provided by the first microphone 26*a*. As described above, an estimate of any of the desired signal portions $s_m[i]$ could be used equivalently. In one particular embodiment, the estimate signal $\hat{s}_1[i]$ is the desired output of the hands-free system 10, providing a high quality, noise reduced signal to a remote person.

In one embodiment the signal processor 30 provides processing that comprises minimizing the variance of $\mu[i]$, where the variance of $\mu[i]$ can be expressed as:

$$\mathrm{Var}\mu[i]=E\{|\mu[i]|^2\}.$$

or equivalently:

$$\mathrm{Var}\{s_1[i]-\hat{s}_1[i]\}=E\{|s_1[i]-\hat{s}_1[i]|^2\}$$

The above equations are used in conjunction with figures below to more fully describe the processing provided by the signal processor 30.

Figure 2:
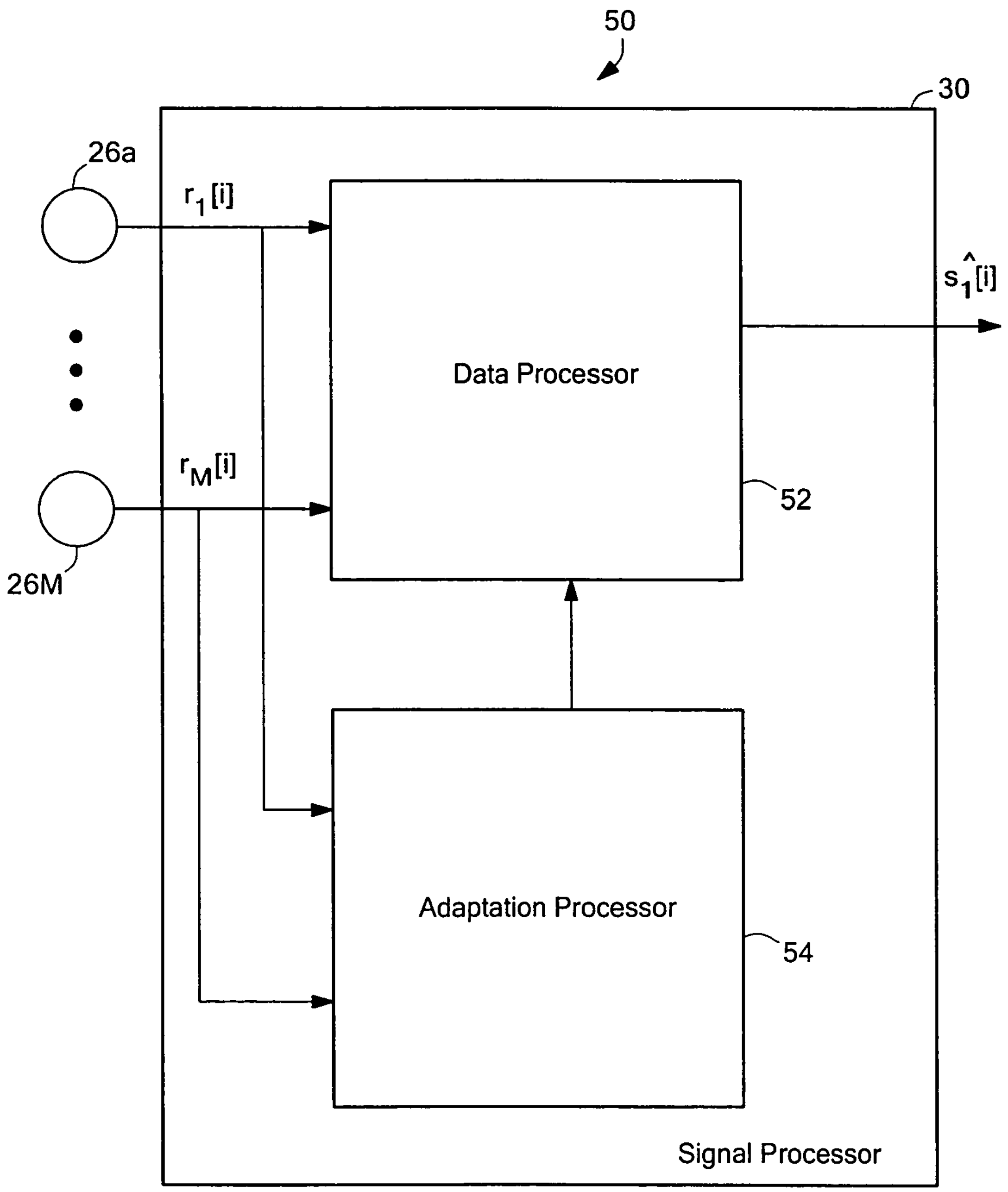
FIG. 2 is a block diagram of a portion of the hands-free system of FIG. 1, including an exemplary signal processor.

Referring now to FIG. 2, a portion 50 of an the exemplary hands-free system 10 of FIG. 1, in which like elements of FIG. 1 are shown having like reference designations, includes the one or more microphones 26*a*–26M coupled to the signal processor 30. The signal processor 30 includes a data processor 52 and an adaptation processor 54 coupled to the data processor. The microphones 26*a*–26M provide the signals $r_m[i]$ to the data processor 52 and to the adaptation processor 54.

In operation, the data processor 52 receives the signal $r_m[i]$ from the one or more microphones 26*a*–26M and, by processing described more fully below, provides an estimate signal $\hat{s}_m[i]$ of a desired signal portion $s_m[i]$ corresponding to one of the microphones 26*a*–26M, for example an estimate signal $\hat{s}_1[m]$ of the desired signal portion $s_1[i]$ of the signal $r_1[i]$ provided by the microphone 26*a*. It will be recognized that the desired signal portion $s_1[i]$, corresponds to the local voice signal 14 (FIG. 1) and in particular to the local voice signal $s_1[i]$ (FIG. 1) provided by the person 12 (FIG. 1) along the path 15*a* (FIG. 1). However, in other embodiments, the desired signal portion $s_m[i]$ provided by any of the one or more microphones 26*a*–26M can be used equivalently in place of $s_1[i]$ above, and therefore, the estimate becomes $\hat{s}_m[i]$.

While in operation, the adaptation processor 54 dynamically adapts the processing provided by the data processor 52 by adjusting the response of the data processor 52. The adaptation is described in more detail below. The adaptation processor 54 thus dynamically adapts the processing performed by the data processor 52 to allow the data processor to provide an audio output as an estimate signal $\hat{s}_1[i]$ having a relatively high quality, and a relatively high signal to noise ratio in the presence of the varying local voice signal 14 (FIG. 1), the varying remote voice signal 22 (FIG. 1), and the varying environmental noise signal 18 (FIG. 1). The variation of these signals is described above in conjunction with FIG. 1.

Figure 3:
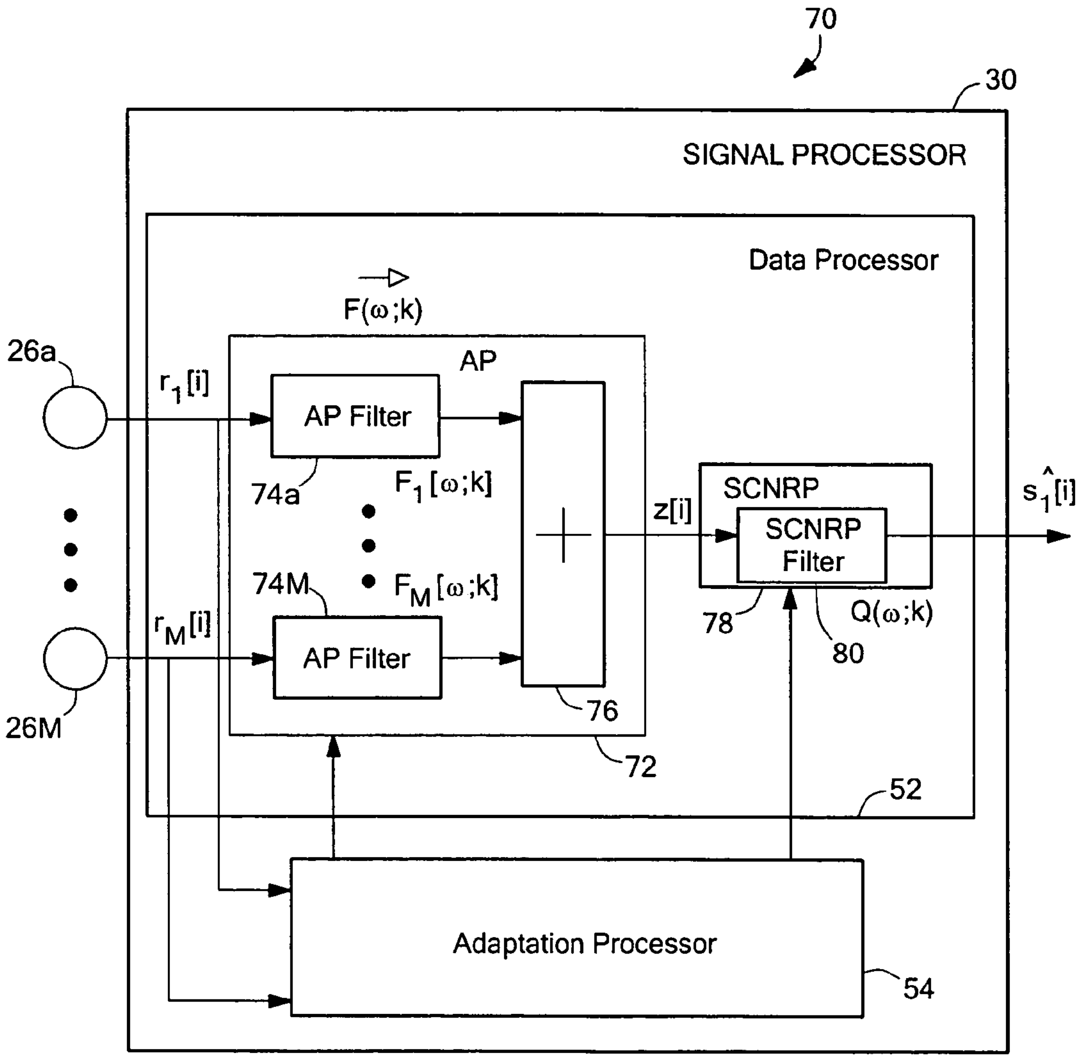
FIG. 3 is a block diagram showing greater detail of the exemplary signal processor of FIG. 2.

Referring now to FIG. 3, a portion 70 of the exemplary hands-free system 10 of FIG. 1, in which like elements of FIG. 1 are shown having like reference designations, includes the one or more microphones 26*a*–26M coupled to the signal processor 30. The signal processor 30 includes the data processor 52 and the adaptation processor 54 coupled to the data processor 52. The microphones 26*a*–26M provide the signals $r_m[i]$ to the data processor 52 and to the adaptation processor 54.

The data processor 52 includes an array processor (AP) 72 coupled to a single channel noise reduction processor (SCNRP) 78. The AP 72 includes one or more AP filters 74*a*–74M, each coupled to a respective one of the one or more microphones 26*a*–26M. The outputs of the one or more AP filters 74*a*–74M are coupled to a combiner circuit 76. In one particular embodiment, the combiner circuit 72 performs a simple sum of the outputs of the one or more AP filters 74*a*–74M. In total, the AP 72 has one or more inputs and a single scalar-valued output comprising a time series of values.

The SCNRP 78 includes a single input, single output SCNRP filter. The input to the SCNRP filter 80 is an intermediate signal z[i] provided by the AP 72. The output of the SCNRP filter provides the estimate signal $\hat{s}_1[i]$ of the desired signal portion $s_1[i]$ of z[i] corresponding to the first microphone 26*a*. The estimate signal $\hat{s}_1[i]$, and alternate embodiments thereof, is described above in conjunction with FIG. 2.

In operation, the adaptation processor 54 dynamically adapts the response of each of the AP filters 74*a*–74M and the response of the SCNRP filter 80. The adaptation is described in greater detail below.

Figure 4:
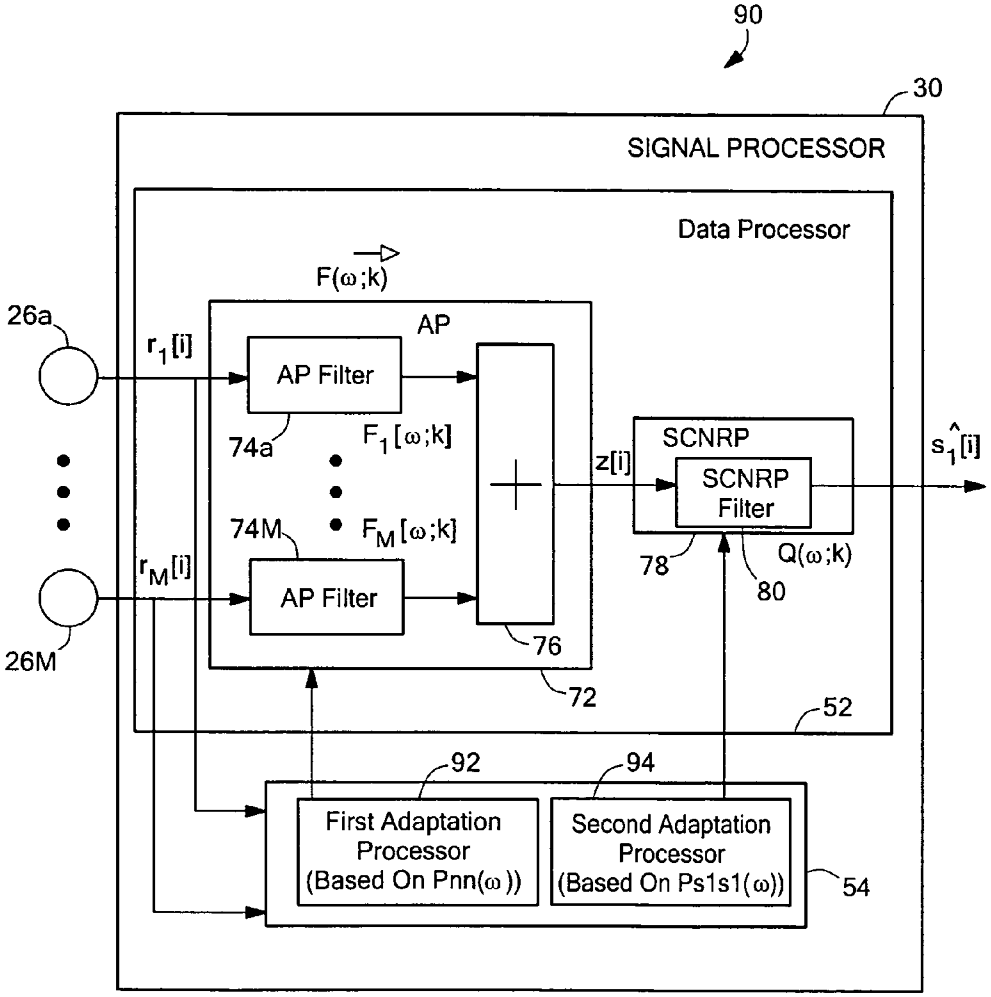
FIG. 4 is a block diagram showing greater detail of the exemplary signal processor of FIG. 3.

Referring now to FIG. 4, a portion 90 of an the exemplary hands-free system 10 of FIG. 1, in which like elements of FIG. 1 are shown having like reference designations, includes the one or more microphones 26*a*–26M coupled to the signal processor 30. The signal processor 30 includes the data processor 52 and the adaptation processor 54 coupled to the data processor 52. The microphones 26*a*–26M provide the signals $r_m[i]$ to the data processor 52 and to the adaptation processor 54.

The data processor 52 includes the array processor (AP) 72 coupled to the single channel noise reduction processor (SCNRP) 78. The AP 72 includes the one or more AP filters 74*a*–74M. The outputs of the one or more AP filters 74*a*–74M are coupled to the combiner circuit 76.

The adaptation processor 54 includes a first adaptation processor 92 coupled to the AP 72, and to each AP filter 74*a*–74M therein. The first adaptation processor 92 provides a dynamic adaptation of the one or more AP filters 74*a*–74M. However, it will be understood that the adaptation provided by the first adaptation processor 92 to any one of the one or more AP filters 74*a*–74M can be the same as or different from the adaptation provided to any other of the one or more AP filters 74*a*–74M.

The adaptation processor 54 also includes a second adaptation processor 94 coupled to the SCNRP 78 and to the SCNRP filter 80 therein. The second adaptation processor 94 provides an adaptation of the SCNRP filter 80.

In operation, the first adaptation processor 92 dynamically adapts the response of each of the AP filters 74*a*–74M in response to noise signals. The second adaptation processor 94 dynamically adapts the response of the SCNRP filter 80 in response to a combination of desired signals and noise signals. Because the signal processor 30 has both a first and a second adaptation processor 92, 94 respectively, each of the two adaptations can be different, for example, they can have different time constants. The adaptation is described in greater detail below.

Figure 5:
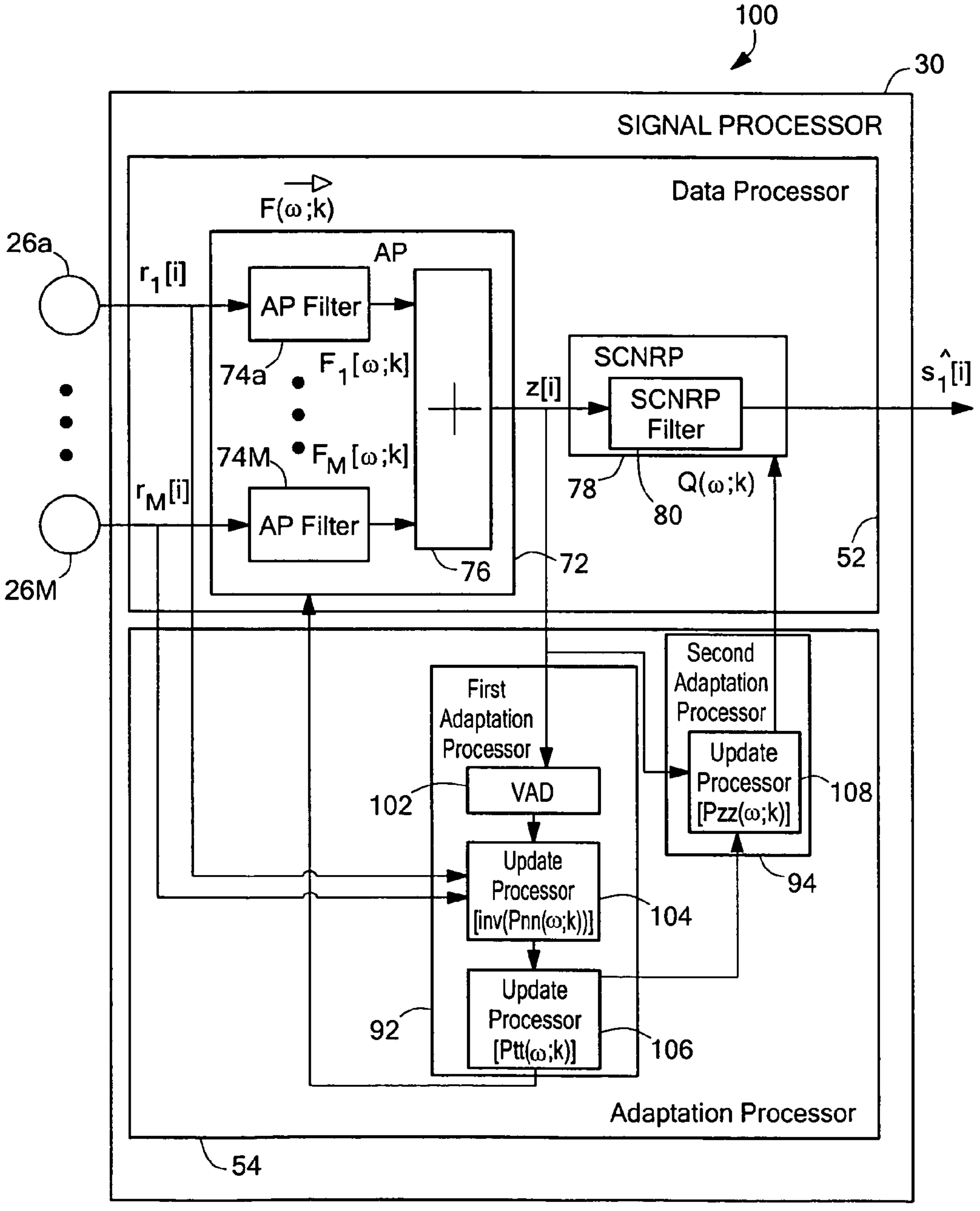
FIG. 5 is a block diagram showing greater detail of the exemplary signal processor of FIG. 4.

Referring now to FIG. 5, a circuit portion 100 of an the exemplary hands-free system 10 of FIG. 1, in which like elements of FIG. 1 are shown having like reference designations, includes the one or more microphones 26*a*–26M coupled to the signal processor 30. The signal processor 30 includes the data processor 52 and the adaptation processor 54 coupled to the data processor. The microphones 26*a*–26M provide the signals $r_m[i]$ to the data processor 52 and to the adaptation processor 54.

The variable 'k' in the notation below is used to denote that the various power spectra are computed upon a k-th frame of data. At a subsequent computation, the various power spectra are computed on a k+1-th frame of data, which may or may not overlap the k-th frame of data. The variable 'k' is omitted from some of the following equations. However, it will be understood that the various power spectra described below are computed upon a particular data frame 'k'.

Notation given above describes the power spectrum notation $P_{\vec{x}\vec{x}}(\omega)$ as an M×M matrix whose (i, j) entry is the Fourier Transform of the (i, j) entry of the autocorrelation function $\rho_{\vec{x}\vec{x}}[t]$ at frequency ω. The adaptation processor 54 can be described with similar notations.

The adaptation processor 54 includes the first adaptation processor 92 coupled to the AP 72, and to each AP filter 74*a*–74M therein. The first adaptation processor 92 includes a voice activity detector (VAD) 102. The VAD is coupled to an update processor 104 that computes a noise power spectrum $P_{\vec{n}\vec{n}}(\omega; k)$. The update processor 104 is coupled to an update processor 106 that receives the power spectrum and computes a noise power spectrum $P_u(\omega; k)$ therefrom. The power spectrum $P_u(\omega; k)$ is a power spectrum of the noise portion of the intermediate signal z[i]. In combination, the two update processors 104, 106 provide the noise power spectrums $P_{\vec{n}\vec{n}}(\omega; k)$ and $P_u(\omega; k)$ in order to update the AP filters 74*a*–74M. The update of the AP filters 74*a*–74M is described in more detail below.

The adaptation processor 54 also includes the second adaptation processor 94 coupled to the SCNRP 78 and to the SCNRP filter 80 therein. The second adaptation processor 94 includes an update processor 108 that computes a power spectrum $P_{zz}(\omega; k)$. The power spectrum $P_{zz}(\omega; k)$ is a power spectrum of the entire intermediate signal z[i]. The update processor 108 provides the power spectrum $P_{zz}(\omega; k)$ in order to update the SCNRP filter 80. The update of the SCNRP filter 80 is described in more detail below.

The one or more channels of time-domain input samples $r_1[i]$ to $r_M[i]$ provided to the AP 72 by the microphones 26*a*–26M can be considered equivalently to be a frequency domain vector-valued input signal $\vec{R}(\omega)$. Similarly, the single channel time domain output samples z[i] provided by the AP 72 can be considered equivalently to be a frequency domain scalar-valued output Z(ω). The AP 72 comprises an M-input, single-output linear filter having a response $\vec{F}(\omega)$ expressed in the frequency domain, where each element thereof corresponds to a response $F_m(\omega)$ of one of the AP filters 74*a*–74M. Therefore the output signal Z(ω) can be described by the following equation:

$$Z(\omega) = \sum_{m=1}^{M} F_m(\omega)R_m(\omega) = \vec{F}^T(\omega)\vec{R}(\omega),$$

where $$\vec{F}(\omega)=[F_1(\omega)F_2(\omega)\ldots F_M(\omega)]^T, \text{ and}$$

$$\vec{R}(\omega)=[R_1(\omega)R_2(\omega)\ldots R_M(\omega)]^T$$

As described above, the superscript T refers to the transpose of a vector, therefore $\vec{F}(\omega)$ and $\vec{R}(\omega)$ are column vectors having vector elements corresponding to each microphone 26*a*–26M. The asterisk symbol * corresponds to a complex conjugate.

In operation of the signal processor 54, the VAD 102 detects the presence or absence of a desired signal portion of the intermediate signal z[i]. The desired signal portion can be $s_1[i]$, corresponding to the voice signal provided by the first microphone 26*a*. One of ordinary skill in the art will understand that the VAD 102 can be constructed in a variety of ways to detect the presence or absence of a desired signal portion. While the VAD is shown to be coupled to the intermediate signal z[i], in other embodiments, the VAD can be coupled to one or more of the microphone signals $r_1[i]$ to $r_m[i]$, or to the output estimate signal $\hat{s}_1[i]$.

In operation of the first adaptation processor 92, the response of the filters 74*a*–74*m*, $\vec{F}(\omega)$, is determined so that the output Z(ω) of the AP 72 is the maximum likelihood (ML) estimate of $S_1(\omega)$, where $S_1(\omega)$ is a frequency domain representation of the desired signal portion $s_1[i]$ of the input signal $r_1[i]$ provided by the first microphone 26*a* as described above. Therefore, it can be shown that the responses of the AP filters 74 can be described by vector elements in the equation:

$$\vec{F}^T(\omega) = \frac{1}{\vec{G}^H(\omega)P^{-1}_{\vec{n}\vec{n}}(\omega)\vec{G}(\omega)}\vec{G}^H(\omega)P^{-1}_{\vec{n}\vec{n}}(\omega)$$

In the above equation, $\vec{G}(\omega)$ is the frequency domain vector notation for the transfer function $g_m[i]$ between the microphones as described above, $P_{\vec{n}}(\omega)$ corresponds to the power spectrum of the noise. The transfer function $\vec{F}(\omega)$ provides a maximum likelihood estimate of $S_1(\omega)$ based upon an input of $\vec{R}(\omega)$.

It will be understood that the m-th element of the vector $\vec{F}(\omega)$ is the transfer function of the m-th AP filter 74*m*. With the above vector transfer function, $\vec{F}(\omega)$, the sum, $Z(\omega)$, of the outputs of the AP filters 74*a*–74M includes the desired signal portion $S_1(\omega)$ associated with the first microphone, plus noise. Therefore, the desired signal portion $S_1(\omega)$ passes through the AP filters 74*a*–74M without distortion.

From the above equation, it can be seen that the response of the AP 72, $\vec{F}(\omega)$, does not depend on the power spectrum $P_{s1s1}(\omega)$ of the desired signal portion $s_1[i]$. Instead, it is only dependant upon $P_{\vec{n}\vec{n}}(\omega)$, the power spectrum of the noise signal portions $n_m[i]$. This is as expected, since the AP filters are adapted in response to power spectra computed during times when the VAD 102 indicates the absence of the local voice signal (14, FIG. 1).

The desired signal portion $s_1[i]$ of the input signal $r_1[i]$, corresponding to the local voice signal 14 (FIG. 1), can vary rapidly with time. As seen from the above equation, the response of the AP 72, $\vec{F}(\omega)$, only depends upon the power spectrum $P_{\vec{n}\vec{n}}(\omega)$ of the noise signal portions $n_m[i]$ of the input signal $r_1[i]$, and also on the frequency domain vector $\vec{G}(\omega)$, corresponding to the time domain transfer functions $g_m[i]$ between the microphones described above. Therefore the transfer functions within the vector $\vec{F}(\omega)$ are adapted based only in proportion to the noise, irrespective of a local voice signal 14 (FIG. 1).

The transfer functions $\vec{F}(\omega)$, therefore, can be updated, i.e. have time constants, that vary more slowly than the desired signal portions corresponding to the local voice signal 14 (FIG. 1). As mentioned above, using a slower time constant for adaptation of the AP filters results in a more accurate adaptation of the AP filters. The AP filters are adapted based on estimates of the power spectrum of the noise, and using a slower time constant to estimate the power spectrum of the noise results in a more accurate estimate of the power spectrum of the noise, since, with a slower time constant, a longer measurement window can be used for estimating.

In order to compute the power spectrum $P_{\vec{n}\vec{n}}(\omega)$, and the inverse thereof, the VAD 102 provides to the update processor 104 an indication of when the local voice signal 14 (FIG. 1) is absent, i.e. when the person 12 (FIG. 1) is not talking. Therefore, the update processor 104 computes the power spectrum $P_{\vec{n}\vec{n}}(\omega)$ of the noise signal portions $n_m[i]$ of the input signal $r_m[i]$ during a time, and from time to time, when only the noise signal portions $n_m[i]$ are present. When the person 12 (FIG. 1) is silent, $\vec{r}=\vec{n}[i]$ (since $\vec{s}[i]=0$), and on those frames of data, $\vec{r}[i]$ is used to update the inverse power-spectrum of the noise $P_{\vec{n}\vec{n}}^{-1}(\omega; k)$, and therefore, to compute the transfer functions of the AP filters 74*a*–74M. Therefore, the responses of the AP filters 74*a*–74M, corresponding to the elements of the vector $\vec{F}(\omega)$, are computed at a time when no desired signal portions $s_m[i]$ are present.

As seen in the above equations, the transfer function $\vec{F}(\omega)$ contains terms for the inverse of the power spectrum of the noise. It will be recognized by one of ordinary skill in art that there are a variety of mathematical methods to directly calculate the inverse of a power spectrum, without actually performing a mathematical vector inverse operation may be used. One such method uses a recursive least squares (RLS) algorithm to directly compute the inverse of the power spectrum, resulting in improved processing time. However, other methods can also be used to provide the inverse of the power spectrum $P_{\vec{n}\vec{n}}^{-1}(\omega)$.

The frequency domain representation $Z(\omega)$ of the scalar-valued intermediate output signal $z[i]$ can be expressed as sum of two terms: a term $S_1(\omega)$ due to the desired signal $s_1[i]$ provided by the first microphone 26*a*, and a term $T(\omega)$ due to the noise $t[i]$ provided by the one or more microphones 26*a*–26M. Therefore, it can be shown that:

$$Z(\omega)=S_1(\omega)+T(\omega)$$

where $T(\omega)$ has the following power spectrum:

$$P_{tt}(\omega)=\frac{1}{\vec{G}^H(\omega)P_{\vec{n}\vec{n}}^{-1}(\omega)\vec{G}(\omega)}$$

The scalar-valued $Z(\omega)$ is further processed by the SCNRP filter 80. The SCNRP filter 80 comprises a single-input, single-output linear filter with response:

$$Q(\omega)=\frac{P_{s1s1}(\omega)}{P_{zz}(\omega)}$$

Furthermore, $$P_{zz}(\omega)=P_{s1s1}(\omega)-P_{tt}(\omega) \text{ or equivalently,}$$

$$P_{s1s1}(\omega)=P_{zz}(\omega)-P_{tt}(\omega)$$

In the above equations, $P_{s1s1}(\omega)$ is the power spectrum of the desired signal portion of the first microphone signal $r_1[i]$ within the intermediate output signal $z[i]$, $P_{zz}(\omega)$ is the power spectrum of the intermediate output signal $z[i]$, and $P_{tt}(\omega)$ is the power spectrum of the noise signal portion of the intermediate output signal $z[i]$. Therefore, $Q(\omega)$ can be equivalently expressed as:

$$Q(\omega)=1-\frac{P_{tt}(\omega)}{P_{zz}(\omega)}$$

Therefore, the transfer function $Q(\omega)$ of the SCNRP filter 80 can be expressed as a function of $P_{s1s1}(\omega)$ and $P_{zz}(\omega)$ or equivalently as a function of $P_{tt}(\omega)$ and $P_{zz}(\omega)$.

Therefore, the second adaptation processor 94, in the embodiment shown, receives the signal $z[i]$, or equivalently the frequency domain signal $Z(\omega)$, and the update processor 108 computes the power spectrum $P_{zz}(\omega)$ corresponding thereto. The update processor 108 is also provided with the power spectrum $P_{tt}(\omega)$ computed by the update processor 106. Therefore, the second adaptation processor 94 can provide the SCNRP filter 80 with sufficient information to generate the desired transfer function $Q(\omega)$ described by the above equations.

While the second update processor updates the SCNRP filter 80 based upon $P_{tt}(\omega)$ and $P_{zz}(\omega)$, in another embodiment, an alternate second update processor updates the SCNRP filter 80 based upon $P_{s1s1}(\omega)$ and $P_{zz}(\omega)$. The above equations show these two alternatives to be equivalent.

In one particular embodiment, the SCNRP filter 80 is essentially a single-input single-output Weiner filter. The cascaded system of FIG. 5, consisting of the AP 72 followed by the SCNRP 78, is mathematically equivalent to an M-input/1-output Wiener filter for estimating $S_1(\omega)$ based on $\vec{R}(\omega)$, where the transfer function of the Wiener filter is described by the equation:

$$\vec{H}(w)=\vec{F}(\omega)\times Q(\omega).$$

Referring again to the above equation for $\vec{F}(\omega)$, that describes the transfer function of the AP filters 74*a*–74M, the hands-free system can also adapt the transfer function $\vec{G}(\omega)$ in addition to the dynamic adaptations to the AP filters 74 and the SCNRP filter 80. It is discussed above that $g_m[i]$ is the transfer function between the desired signal $s_1[i]$ and the other desired signals $s_m[i]$:

$$s_m[i]=g_m[i]*s_1[i]$$

or equivalently $$S_m(\omega)=G_m(\omega)S_1(\omega)$$

Given samples of the desired signal portions $s_m[i]$, a variety of techniques known to one of ordinary skill in the art can be used to estimate $G_m(\omega)$. One such technique is described below.

To collect samples of the desired signal portions $s_m[i]$ at the output of the microphones 26*a*–26M, the person 12 (FIG. 1) must be talking and the noise $\vec{n}[i]$ corresponding to the environmental noise signals $v_m[i]$ and the remote voice signals $e_m[i]$ must be much smaller than the desired signal $\vec{s}[i]$, i.e. the SNR at the output of each microphone 26*a*–26M must be high. This high SNR occurs whenever the talker is talking in a quiet environment.

Whenever the SNR is determined to be high, the signal processor 30 can collect the desired signal $s_1[i]$ ($s_1[i]=r_1[i]$ for high SNR) from the output of the m-th microphone. The signal processor 30 can then use these samples to estimate the cross power-spectrum between $s_1[i]$ and $s_m[i]$ (denoted herein as $P_{s1sm}(\omega)$). A well-known method for estimating $P_{s1sm}(\omega)$ from samples of $s_1[i]$ and $s_m[i]$ is the Welch method of spectral estimation. Recall that $P_{s1sm}(\omega)$ is the Fourier Transform of:

$$\rho_{s1sm}[t]=E\{s_1[i]s_m[i+t]\};$$

therefore $P_{s1sm}(\omega)$ can be estimated.

Once $P_{s1sm}(\omega)$ is estimated, the signal processor 30 can use $P_{s1sm}(\omega)/P_{s1s1}(\omega)$ as the final estimate of $G_m(\omega)$, where $P_{s1s1}(\omega)$ is the power spectrum of $s_1[i]$ obtained using a Welch method.

In one particular embodiment, the person 12 (FIG. 1) can explicitly initiate the estimation of $\vec{G}(\omega)$ by commanding the system to start estimating $\vec{G}(\omega)$ at a particular time (e.g. by pushing a button and starting to talk). With this particular arrangement, the person 12 (FIG. 1) commands the system to start estimating $G(\omega)$ only when they determine that the SNR is high (i.e. the noise is low). Generally, in the environment of an automobile, for example, $\vec{G}(\omega)$ changes little over time for a particular user and for a particular automobile. Therefore, $\vec{G}(\omega)$ can be estimated once at installation of the hands free system 10 (FIG. 1) into the automobile.

In some arrangements, the hands-free system 10 (FIG. 1) can be used as a front-end to a speech recognition system that requires training. Such speech recognition systems (SRS) require the user to train the SRS by uttering a few words/phrases in a quiet environment. The noise reduction system can use the same training period for estimating $\vec{G}(\omega)$ since, the training of the SRS is done also in a quiet environment.

Alternatively, the signal processor 30 can determine when the SNR is high, and it can initiate the process for estimating $\vec{G}(\omega)$. For example, in one particular embodiment, to estimate the SNR at the output of the first microphone, the signal processor 30, during the time when the talker is silent (as determined by the VAD 102), measures the power of the noise at the output of the first microphone 26*a*. The signal processor 30, during the time when the talker is active (as determined by the VAD 102), measures the power of the speech plus noise signal. The signal processor 30 estimates the SNR at the output of the first microphone 26*a* as the ratio of the power of the speech plus noise signal to the noise power. The signal processor 30 compares the estimated SNR to a desired threshold, and if the computed SNR exceeds the threshold, the signal processor 30 identifies a quiet period and begins estimating elements of $\vec{G}(\omega)$.

In either arrangement, upon either identification of a quiet period by a user or by the signal processor 30, each element of $\vec{G}(\omega)$ is estimated by the signal processor 30 as the ratio of the cross power spectra $P_{s1sm}(\omega)$ to the power spectrum $P_{s1s1}(\omega)$ Therefore, having adapted the AP filters 74 with the transfer function $\vec{F}(\omega)$ above, the SCNRP filters with the transfer function $Q(\omega)$ above, and the transfer functions $\vec{G}(\omega)$ with the techniques above, the output of the hands-signal processor 30 is the estimate signal $\hat{s}_1[i]$, as desired.

The noise signal portions $n_m[i]$ and the desired signal portions $s_m[i]$ of the microphone signals $r_m[i]$ can vary at substantially different rates. Therefore, the structure of the signal processor 30, having the first and the second adaptation processors 92, 94 respectively, can provide different adaptation rates for the AP filters 74*a*–74M and for the SCNRP filter 80. As described above, having different adaptation rates results in a more accurate adaptation of the AP filters; therefore, this results in improved noise reduction.

Figure 6:
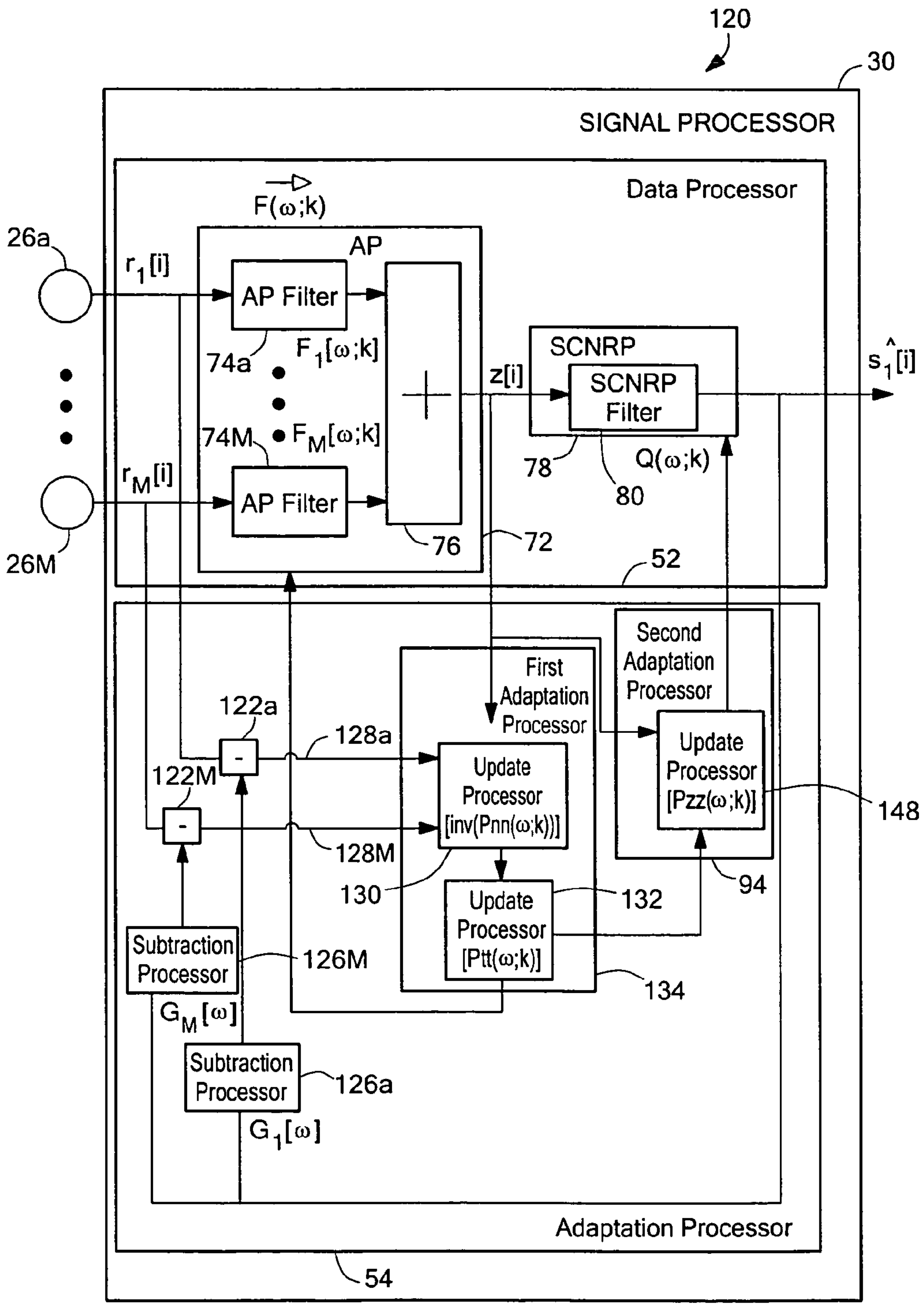
FIG. 6 is a block diagram showing an alternate embodiment of the exemplary signal processor of FIG. 5.

Referring now to FIG. 6, a circuit portion 120 of an the exemplary hands-free system 10 of FIG. 1, in which like elements of FIG. 1 are shown having like reference designations, includes a first adaptation processor 134. Unlike the first adaptation processor 92 of FIG. 5, the first adaptation processor 134 does not contain the VAD 102 (FIG. 5). Therefore, an update processor 130, must compute the noise power spectrum $P_{\vec{n}\vec{n}}(\omega)$ while both the noise portions $n_m[i]$ of the input signals $r_m[i]$ and the desired signal portions $s_m[i]$ of the input signals $r_m[i]$ are present, i.e. while the person 12 (FIG. 1) is talking.

In this particular embodiment, in order to accomplish calculation of $P_{\vec{n}\vec{n}}(\omega)$ while the person 12 (FIG. 1) is talking, it would be desirable to subtract the desired signal portions $s_m[i]$ from the input signals $r_m[i]$ before receiving them with the first adaptation processor 134. However, the desired signal portions $s_m[i]$ are not explicitly known by the signal processor 30. Therefore, signals representing the desired signal portions $s_m[i]$ are instead subtracted from input signals $r_m[i]$.

A good estimate of a particular desired signal portion from the first microphone appears as the estimate signal $\hat{s}_1[i]$ at the output of the SCNRP filter 80. Therefore, in one embodiment, the estimate signal $\hat{s}_1[i]$ is passed through subtraction processors 126_a_–126M, and the resulting signals are subtracted from the input signals $r_m[i]$ via subtraction circuits 122_a_–122M to provide subtracted signals 128_a_–128M to the update processor 130. The subtraction processors 126_a_–126M comprise filters that operate upon the estimate signal $\hat{s}_1[i]$. The subtracted signals 128_a_–128M are substantially noise signals, corresponding substantially to the noise signal portions $n_m[i]$ of the input signals $r_m[i]$. Therefore, the update processor 130 can compute the noise power spectrum $P_{\vec{m}}(\omega)$ and the inverse thereof used in computation of the responses $\vec{F}(\omega)$ of the AP filters 74_a_–74M from the equations given above.

While this embodiment 120 couples the subtraction processors 126_a_–126M to the estimate signal $\hat{s}_1[i]$ at the output of the SCNRP filter 80, in other embodiments, the subtraction processors can be coupled to other points of the system. For example, the subtraction filters can be coupled to the intermediate signal z[i].

The subtraction processors 126_a_–126M have the transfer functions $G_m(\omega)$, which, as described above, relate the desired signal portion of the first microphone $S_1(\omega)$ to the desired signal portion of the m-th microphone $S_m(\omega)$, (i.e. $G_m(\omega)=S_m(\omega)/S_1(\omega)$).

Figure 7:
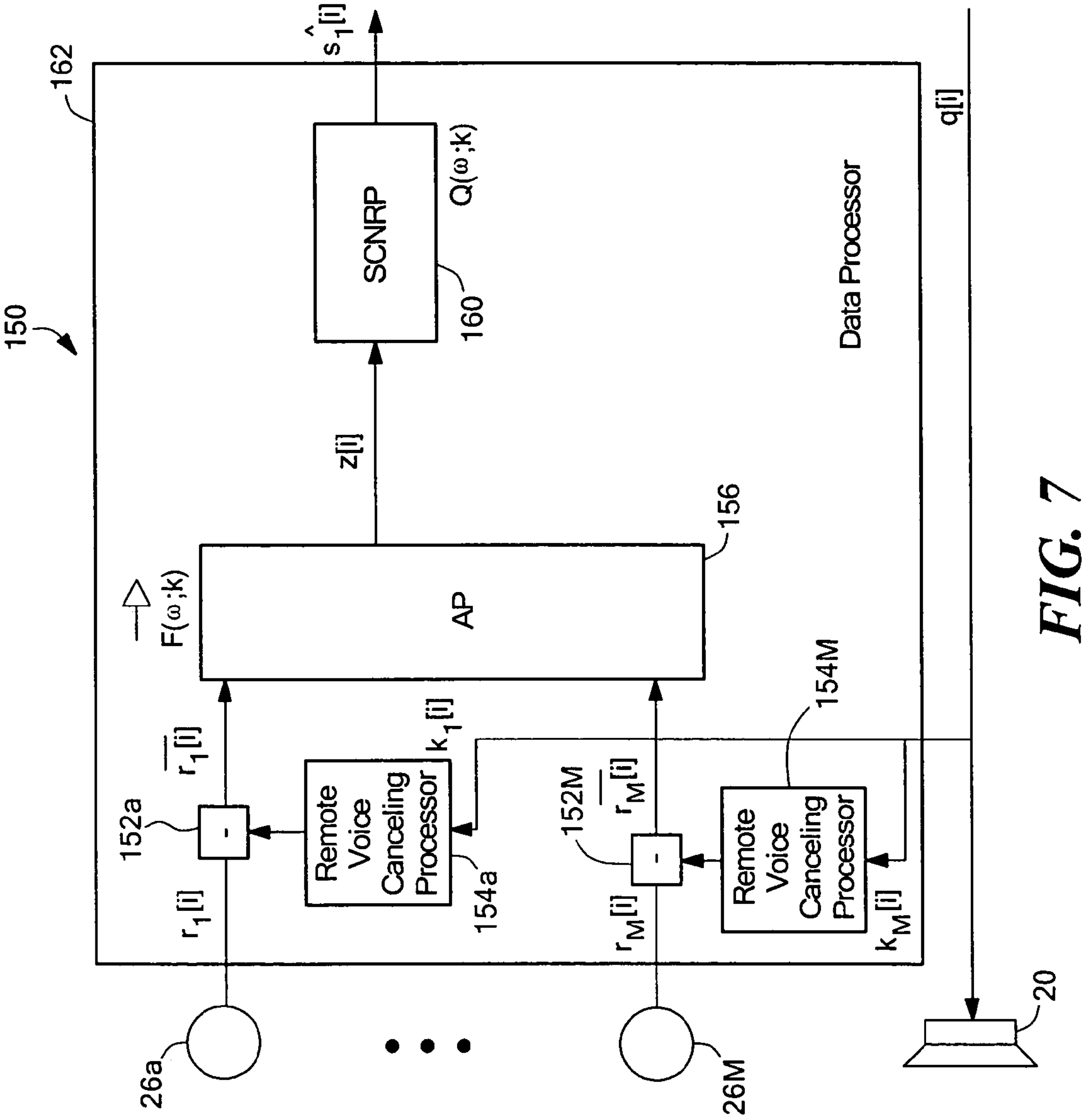
FIG. 7 is a block diagram of an exemplary echo canceling processor arrangement, which may be used in the exemplary signal processor of FIGS. 1–6.

Referring now to FIG. 7, a circuit portion 150 of an the exemplary hands-free system 10 of FIG. 1, in which like elements of FIG. 1 are shown having like reference designations, includes a data processor 162. The data processor 162 is shown without the first and second adaptation processors 134, 94 respectively of FIG. 6. However, it will be understood that the data processor 162 is but part of a signal processor, for example the signal processor 30 of FIG. 6, which includes first and second adaptation processors, for example the first and second adaptation processors 134, 94 of FIG. 6.

The data processor 162 includes an AP 156 and a SCNRP 160 that can correspond, for example to the AP 52 and the SCNRP 78 of FIG. 6. The remote-voice-producing signal q[i] that drives the loudspeaker 20 to produce the remote voice signal 22 (FIG. 1) is introduced to remote voice canceling processors 154_a_–154M. The remote voice canceling processors 154_a_–154M comprise filters that operate upon the remote-voice-producing signal q[i]. The outputs of the remote voice canceling processors 154_a_–154M are subtracted via subtraction circuits 152_a_–152M from the signals $r_1[i]$ to $r_m[i]$ provided by the microphones 26_a_–26_m_. Therefore, noise attributed to the remote-voice-producing signal q[i] which forms a part of the signals $r_1[i]$ to $r_m[i]$ is subtracted from the signals $r_1[i]$ to $r_m[i]$ before the subsequent processing is performed by the AP 156 in conjunction with first and second adaptation processors (not shown).

Therefore, in this particular embodiment:

$$\bar{r}_m[i]=r_m[i]-k_m[i]*q[i],\ \text{m=1 to M}$$

In the above equation, $k_m[i]$ is the impulse-response associated with the transfer function of the m-th remote voice-canceling filter, $K_m(\omega)$ , where $K_m(\omega)$ is an estimate of the transfer function with input q[i] and output $e_m[i]$, (i.e., $K_m(\omega)=E_m(\omega)/Q(\omega)$).

With this particular arrangement, the effect of the remote voice-producing signal q[i] on intelligibility of the estimate signal $\hat{s}_1[i]$ is reduced with the remote voice canceling processors 154_a_–154M.

Figure 8:
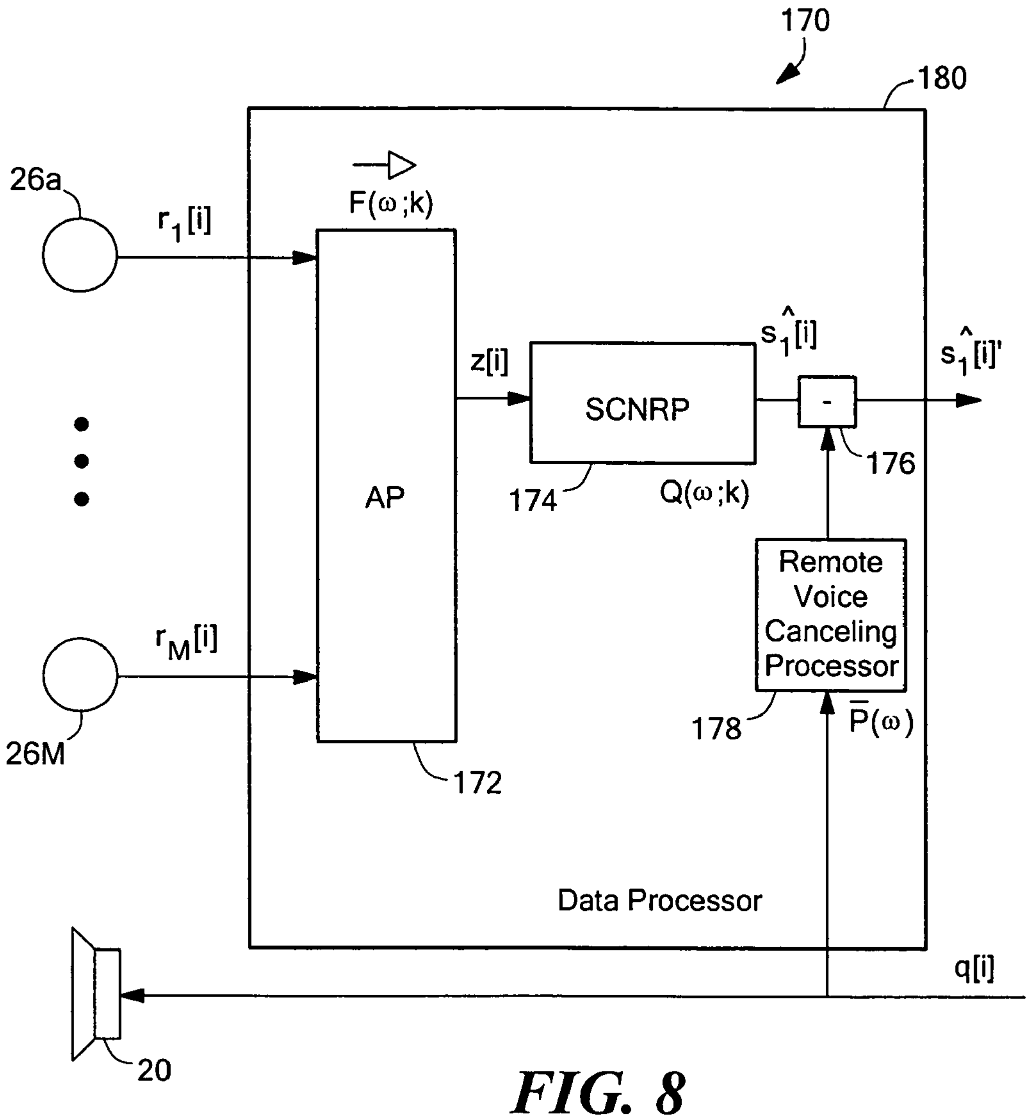
FIG. 8 is a block diagram of an alternate echo canceling processor arrangement, which may be used in the exemplary signal processor of FIGS. 1–6.

Referring now to FIG. 8, a circuit portion 170 of an the exemplary hands-free system 10 of FIG. 1, in which like elements of FIG. 1 are shown having like reference designations, includes a data processor 180. The data processor 180 is shown without the first and second adaptation processors 134, 94 respectively of FIG. 6. However, it will be understood that the data processor 180 is but part of a signal processor, for example the signal processor 30 of FIG. 6, which includes first and second adaptation processors, for example the first and second adaptation processors 134, 94 of FIG. 6.

The data processor 180 includes an AP 172 and a SCNRP 174 that can correspond, for example to the AP 52 and the SCNRP of FIG. 6. The remote-voice-producing signal q[i] that drives the loudspeaker 20 to produce the remote voice signal 22 (FIG. 1) is introduced to a remote voice canceling processor 178. The remote voice canceling processor 178 comprises a filter that operates upon the remote-voice-producing signal q[i]. The output of the remote voice canceling processor 178 is subtracted via subtraction circuit 176 from the estimate signal $\hat{s}_1[i]$, therefore providing an improved estimate signal $\hat{s}_1[i]'$. Therefore, noise attributed to the remote-voice-producing signal q[i] which forms a part of the signals $r_1[i]$ to $r_m[i]$ is subtracted from the final output of the data processor 180.

The response of the signal channel between q[i] and the output of the SCNRP 174 is:

$$\bar{P}(\omega)=\sum_{m=1}^{M} K_m(\omega)F_m(\omega)Q(\omega)$$

In the above equation, $K_m(\omega)$ is the transfer function of the acoustic channel with input q[i] and output $e_m[i]$, $F_m(\omega)$ is the transfer function of the m-th filter of the AP 172, and $Q(\omega)$ is the transfer function of the SCNRP 174.

With this particular arrangement, the effect of the remote-voice-producing signal q[i] on intelligibility of the improved estimate signal $\hat{s}_1[i]'$ is reduced with but one echo-canceling processor 178.

Figure 9:
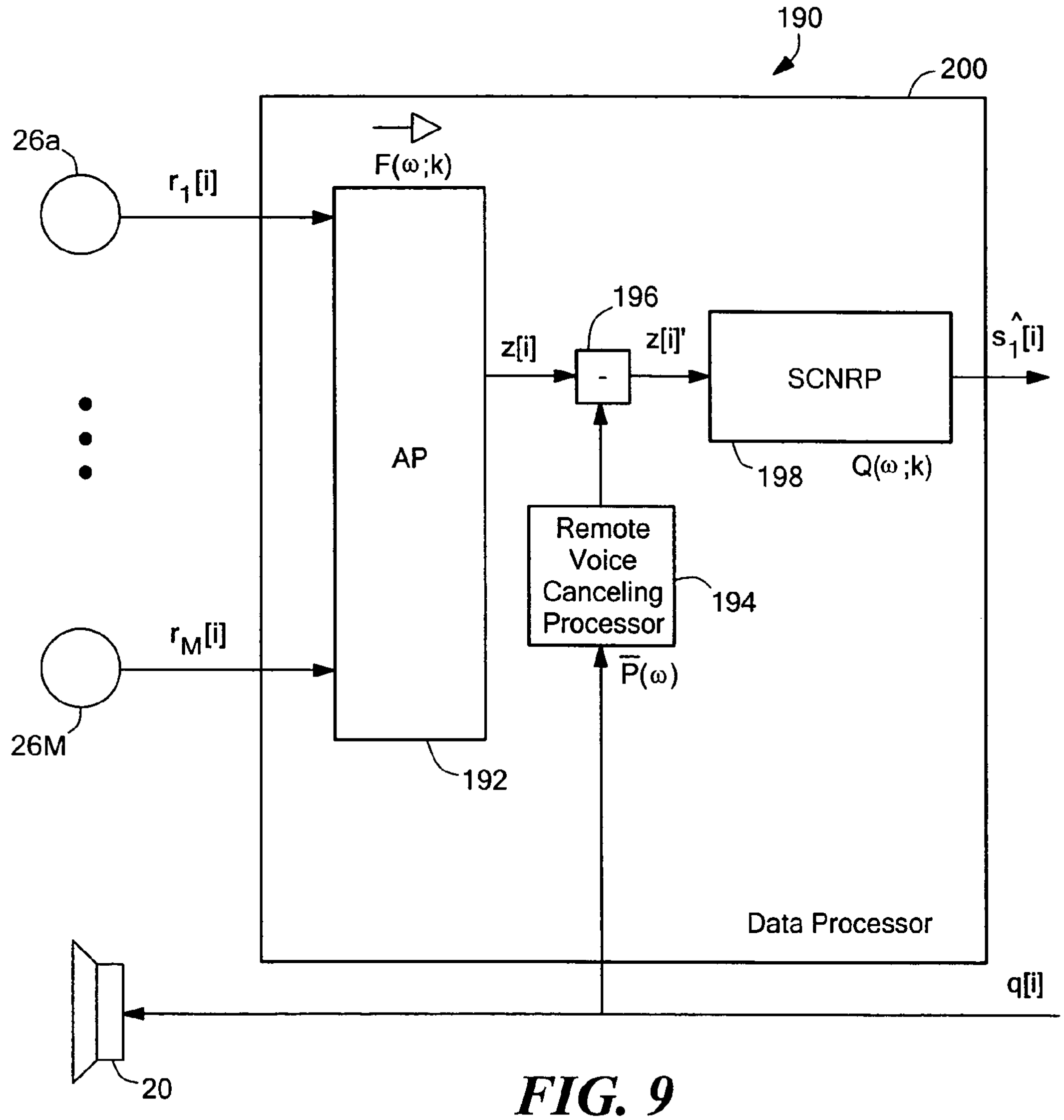
FIG. 9 is a block diagram of yet another alternate echo canceling processor arrangement, which may be used in the exemplary signal processor of FIGS. 1–6.

Referring now to FIG. 9, a circuit portion 190 of the exemplary hands-free system 10 of FIG. 1, in which like elements of FIG. 1 are shown having like reference designations, includes a data processor 200. The data processor 200 is shown without the first and second adaptation processors 134, 94 respectively of FIG. 6. However, it will be understood that the data processor 200 is but part of a signal processor, for example the signal processor 30 of FIG. 6, which includes first and second adaptation processors, for example the first and second adaptation processors 134, 94 of FIG. 6.

The data processor 200 includes an AP 192 and a SCNRP 198 that can correspond, for example to the AP 52 and the SCNRP of FIG. 6. The remote-voice-producing signal q[i] that drives the loudspeaker 20 to produce the remote voice signal 22 (FIG. 1) is introduced to remote voice canceling processor 194. The remote voice canceling processor 194 comprises a filter that operates upon the remote-voice-producing signal q[i]. The output of the remote voice canceling processor 194 is subtracted via subtraction circuit 196 from the intermediate signal z[i], therefore providing an improved estimate signal z[i]'. Therefore, noise attributed to the remote-voice-producing signal q[i] which forms a part of the signals $r_1[i]$ to $r_m[i]$ is subtracted from the intermediate signal z[i].

The response of the signal channel between q[i] and the output of the AP 172 is:

$$\tilde{P}(\omega) = \sum_{m=1}^{M} K_m(\omega) F_m(\omega)$$

In the above equation, $K_m(\omega)$ is the transfer function of the acoustic channel with input q[i] and output $e_m[i]$, and $F_m(\omega)$ is the transfer function of the m-th filter within the AP 172.

With this particular arrangement, the effect of the remote-voice-producing signal q[i] on intelligibility of the estimate signal $\hat{s}_1[i]$ is reduced with but one echo-canceling processor 194.

Figure 10:
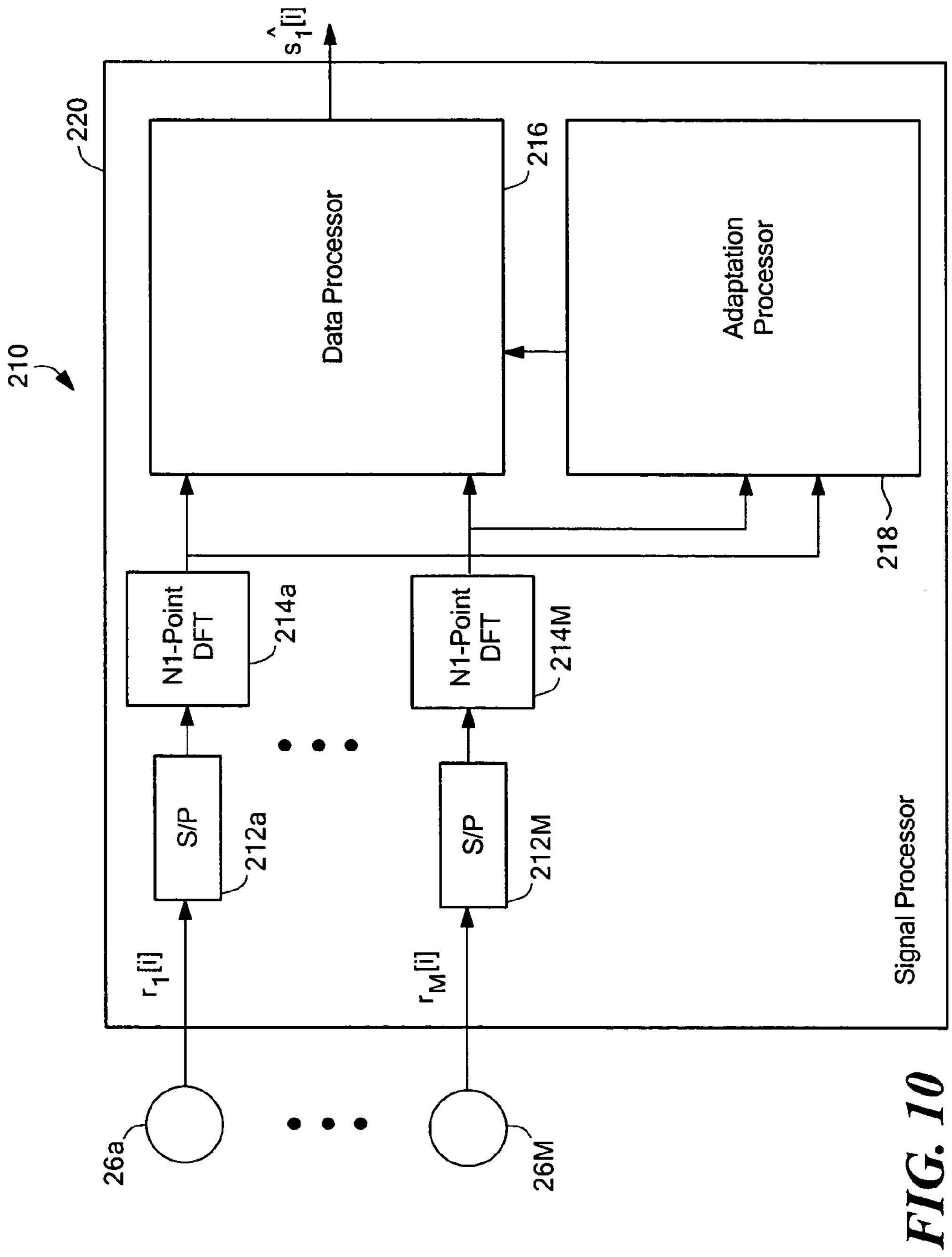
FIG. 10 is a block diagram of a circuit for converting a signal from the time domain to the frequency domain which may be used in the exemplary signal processor of FIGS. 1–6.

Referring now to FIG. 10, a circuit portion 210 of an the exemplary hands-free system 10 of FIG. 1, in which like elements of FIG. 1 are shown having like reference designations, includes the microphones 26*a*–26M each coupled to a respective serial-to-parallel converter 212*a*–212M. The serial to parallel converters store data samples from the signals $r_1[i]$–$r_m[i]$ into data groups. The serial to parallel converters 212*a*–212M provide the data groups to N1-point discrete Fourier transform (DFT) processors 214*a*–214M. The DFT processors 212*a*–212M are each coupled to a data processor 216 and an adaptation processor 218 which can be similar to the data processor 52 and adaptation processor 54 described above in conjunction with FIG. 6.

In operation, the DFT processors convert the time-domain samples $r_m[i]$ into frequency domain samples, which are provided to the data processor 216 and to the adaptation processor 218. Therefore, frequency domain samples are provided to both the data processor 216 and the adaptation processor 218. Filtering performed by AP filters (not shown) within the data processor 216 and power spectrum calculations provided by the adaptation processor 218 can be done in the frequency domain as is described above.

Figure 11:
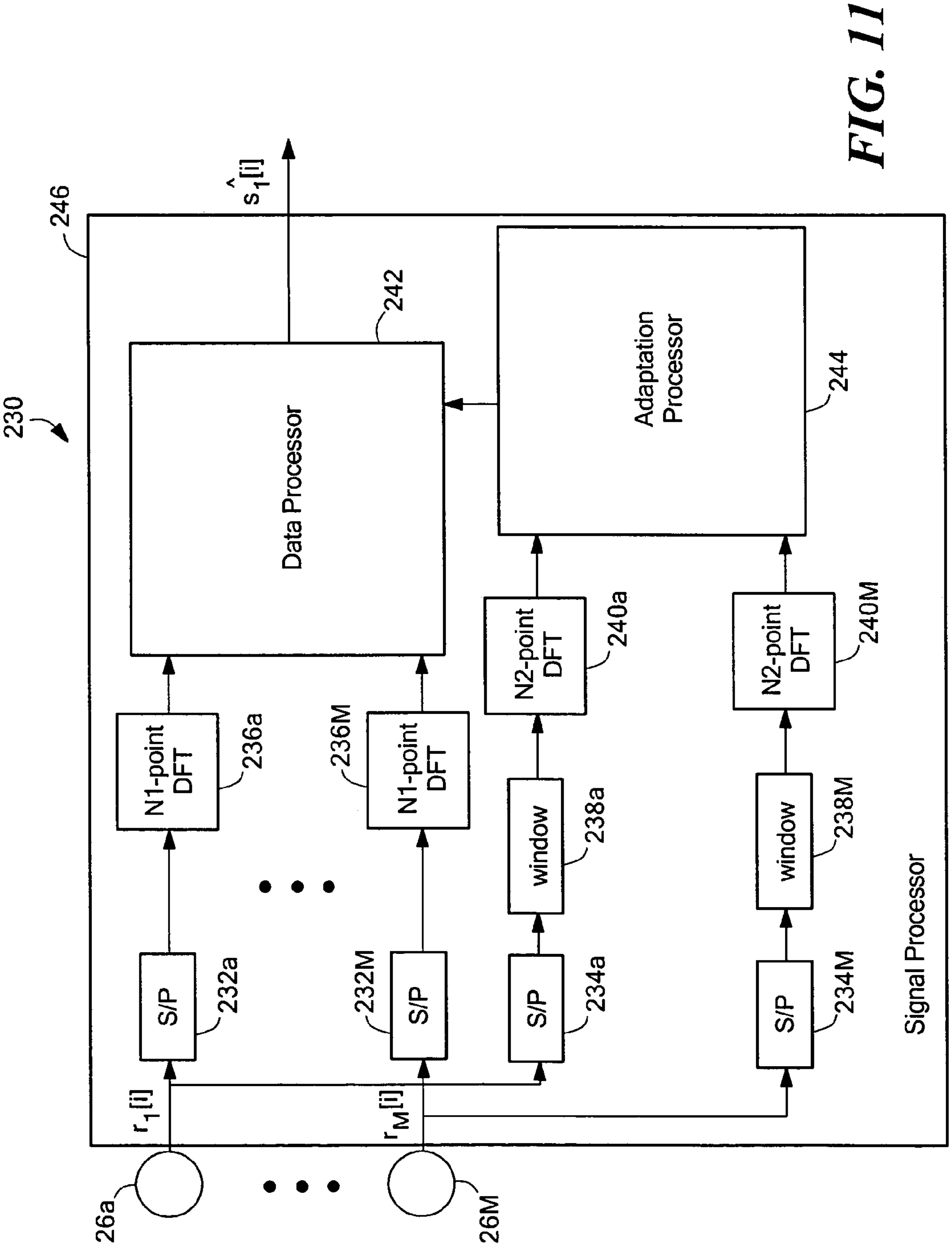
FIG. 11 is a block diagram of an alternate circuit for converting a signal from the time domain to the frequency domain, which may be used in the exemplary signal processor of FIGS. 1–6.

Referring now to FIG. 11, a circuit portion 230 of an the exemplary hands-free system 10 of FIG. 1, in which like elements of FIG. 1 are shown having like reference designations, includes the microphones 26*a*–26M each coupled to respective serial-to-parallel converter 232*a*–232M and respective serial-to parallel converters 234*a*–234M. The serial to parallel converters store data samples from the signals $r_1[i]$ to $r_m[i]$ into data groups and provide the data groups to N1-point discrete Fourier transform (DFT) processors 236*a*–236M. The serial to parallel converters 234*a*–234M provide the data groups to window processors 238*a*–238M and thereafter to N2-point discrete Fourier transform (DFT) processors 238*a*–238M. The DFT processors 236*a*–236M are each coupled to a data processor 242. The DFT processors 240*a*–240M are each coupled to an adaptation processor 244. The data processor 242 and the adaptation processor 244 can be the type of data processor 52 and adaptation processor 54 of FIG. 6.

In operation, the DFT processors convert the time-domain data groups into frequency domain samples, which are provided to the data processor 242 and to the adaptation processor 244. Therefore, frequency domain samples are provided to both the data processor 242 and the adaptation processor 244. Therefore, filtering provided by AP filters (not shown) in the data processor 242 and power spectrum calculations provided by the adaptation processor 244 can be done in the frequency domain as is described above.

It is known in the art that the accuracy of estimating the noise power spectrum $P_{\vec{n}\vec{n}}(\omega)$ and the inverse thereof $P_{\vec{n}\vec{n}}^{-1}(\omega)$ can be improved by applying a windowing function, such as that provided by the windowing processors 238*a*–238M. Therefore, the windowing processors 238*a*–238M provide the adaptation processor 244 with an improved ability to accurately determine the noise power spectrum and therefore to update the AP filters (not shown) within the data processor 242. However, it is also known that the use of windowing on signals that are used to provide an audio output in the data processor 216 results in distorted audio and a less intelligible output signal. Therefore, while is it desirable to provide the windowing processors 238*a*–238M for the signals to the adaptation processor 244, it is not desirable to provide windowing processors for the signals to the data processor 242.

With the particular arrangement shown in the circuit portion 230, the N1-point DFT processors 236*a*–236M and the N2-point DFT processors 240*a*–240M can compute using a number of time domain data samples N1 different from a number of time domain data samples N2.

Figure 12:
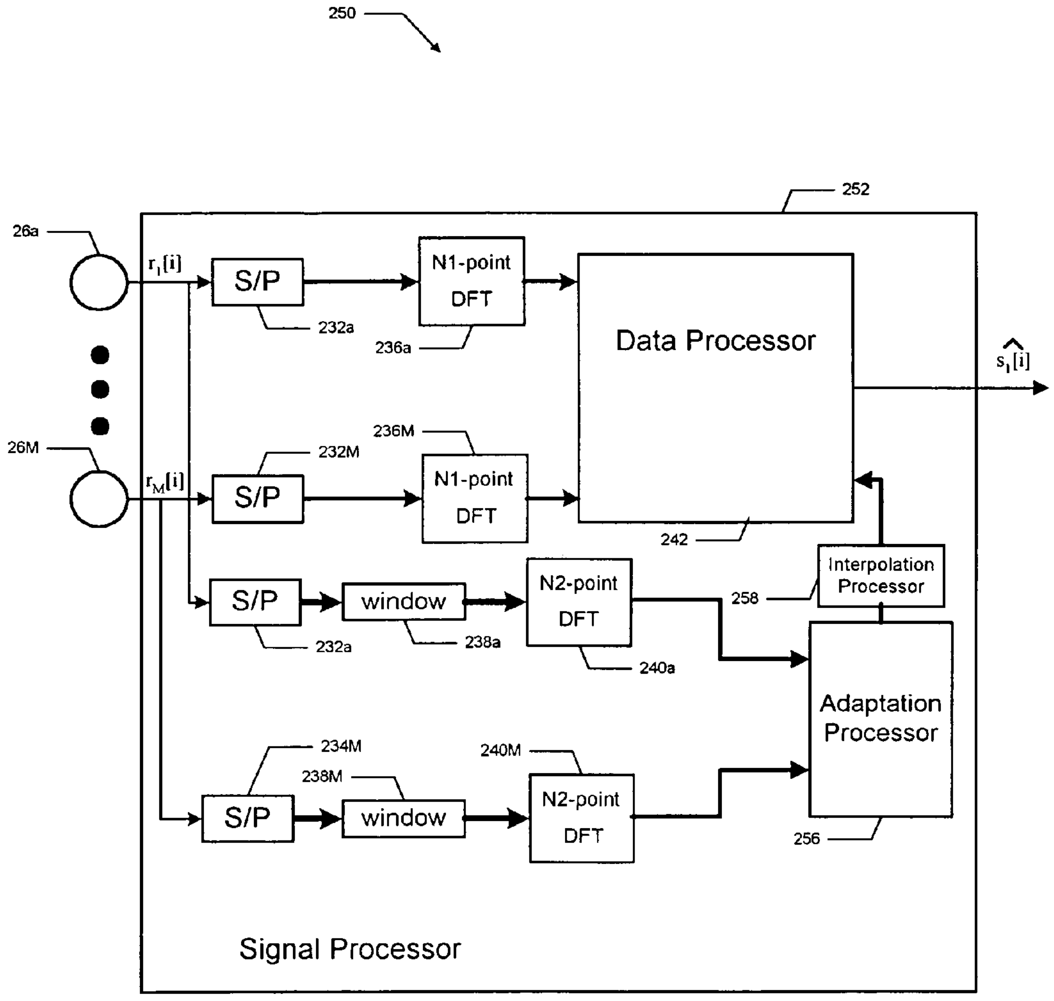
FIG. 12 is a block diagram of yet another alternate circuit for converting a signal from the time domain to the frequency domain, which may be used in the exemplary signal processor of FIGS. 1–6.

Referring now to FIG. 12, in which like elements of FIG. 11 are shown having like reference designations, a circuit portion 250 includes elements of circuit portion 230 of FIG. 11, however, the adaptation processor 244 is replaced by adaptation processor 256, and an interpolation processor 258 is coupled between the adaptation processor 244 and the data processor 242.

As described, for example, in conjunction with FIG. 5, in operation, the adaptation processor 54 (and 244, FIG. 11) provides updates to the data processor 52 (FIG. 5, and 242, FIGS. 11, 12) that are based upon $P_{\vec{n}\vec{n}}(\omega; k)$ and $P_{zz}(\omega; k)$ in the frequency domain, having samples with a predetermined frequency separation.

In operation, the adaptation processor 244 of FIG. 11 provides output samples in the frequency domain to the data processor 242, and the output samples have a predetermined frequency separation. In contrast, the adaptation processor 256 provides output samples in the frequency domain having a greater frequency separation, and therefore fewer output samples. With this particular arrangement, the adaptation processor 256 operates on fewer frequencies compared to the adaptation processor 244 of FIG. 11. Therefore, the adaptation processor 256 can provide a faster adaptation than the adaptation processor 244. In one particular embodiment, the adaption processor 256 provides output samples having twice the frequency separation as the adaption processor 244, and therefore, half as many output samples.

The interpolation processor 258 receives the fewer output samples from the adaptation processor 256 and interpolates between them. Therefore, the interpolation processor 258 can provide samples to the data processor 242 that have the same frequency separation as the samples provided by the adaptation processor 244 of FIG. 11. The processing provided by the interpolation processor 258 in combination with the processing provided by the adaptation processor 256 requires substantially less time than the processing providing by the adaptation processor 244 of FIG. 11.

As an example, consider the computation $P_{\vec{n}\vec{n}}^{-1}(\omega)$ for the case that N2=256 where N2 corresponds to the number of frequency points provided by the N2-point DFT processors 240A–240M. In this case, $P_{\vec{n}\vec{n}}^{-1}(\omega)$ must be computed for 256 frequencies $$\left(\text{i.e. for } \omega = \left(\frac{2\pi}{256} l : l = 0, \ldots, 255\right)\right).$$

We can perform the full adaptation for ω's corresponding to only even values of l $$\left(\text{i.e. for } \omega = \left(\frac{2\pi}{256}\right)(2^{*} j) : j = 0, \ldots, 127\right).$$

We can then approximate $P_{\vec{m}\vec{m}}^{-1}(\omega)$ for ω's corresponding to odd values of l by linear interpolations, i.e.

$$P_{\vec{n}\vec{n}}^{-1}(2j+1)) = 0.5^{*}\left(P_{\vec{n}\vec{n}}^{-1}\left(\frac{2\pi}{256}\right)(2j)\right) + P_{\vec{n}\vec{n}}^{-1}\left(\frac{2\pi}{256}\right)(2j+2)\bigg)\bigg)$$

In the above example, by performing the full adaptation only for half the frequencies, the number of operations needed to update the $P_{\vec{m}\vec{m}}^{-1}(\omega)$ has been reduced to approximately half.

Referring again to the discussions presented in conjunction with FIG. 5, methods for providing the $\vec{G}(\omega)$ vector used by the adaptation processor 54 of FIG. 5 are described. The $\vec{G}(\omega)$ vector has elements $G_m(\omega)$, where m is an index corresponding to ones of a plurality of microphones, for example the microphones 26*a*–26M of FIG. 5. Each $G_m(\omega)$ describes a transfer function between a selected microphone and a reference one of the microphones. Methods described above require some interaction by a user. Interaction by the user ensures that the $\vec{G}(\omega)$ vector is estimated when the signal-to-noise ratio (SNR) is high. However, it would be desirable to estimate the $G_m(\omega)$ elements without any interaction from the user.

One method for estimating the vector elements $G_m(\omega)$ assumes that $\vec{G}(\omega)$ can be any complex-valued vector of size M by 1. Hence, this particular method must search over all possible M by 1 vectors to estimate $\vec{G}(\omega)$. However, apriori information restricting $\vec{G}(\omega)$ to a finite set of vectors can greatly improve the accuracy of estimating $\vec{G}(\omega)$ for a given SNR and the speed by which it can be estimated.

In certain applications of the present invention (e.g., drivers behind the wheel of a particular vehicle model), the $\vec{G}(\omega)$ vector can be approximated as belonging to a finite set of vectors, which can be denoted as $\{\vec{G}_i(\omega)\}_{i=1}^{I}$. Each $\vec{G}_i(\omega)$ corresponds to a particular position (index i) of the user's mouth relative to the microphone array.

For a particular vehicle model, the $\vec{G}_i(\omega)$ vectors can be measured once, for example, during vehicle manufacture, at a number of possible positions of the user's mouth. As described above, the set of measured $\vec{G}(\omega)$ vectors can be represented as $\vec{G}_i(\omega)$, where the index, i, corresponds to selected ones of the set of measured $\vec{G}(\omega)$ vectors. The set of measured $\vec{G}_i(\omega)$ vectors can be stored in each manufactured one of the particular vehicle model. For each car driver or user of the particular vehicle model, the system and method of the present invention can automatically select one of the stored $\vec{G}_i(\omega)$ vectors to provide a selected $\vec{G}(\omega)$ vector used for adaption processing.

The above-described technique, which is further described below in conjunction with FIGS. 13–13B, improves the accuracy of estimating the $\vec{G}(\omega)$ vector at low SNRs, and $\vec{G}(\omega)$ can be accurately estimated even at low SNRs. Therefore, there may be no need for a user to explicitly instruct the system when the SNR is high so that the system can compute the $\vec{G}(\omega)$ vector at that time.

Figure 13:
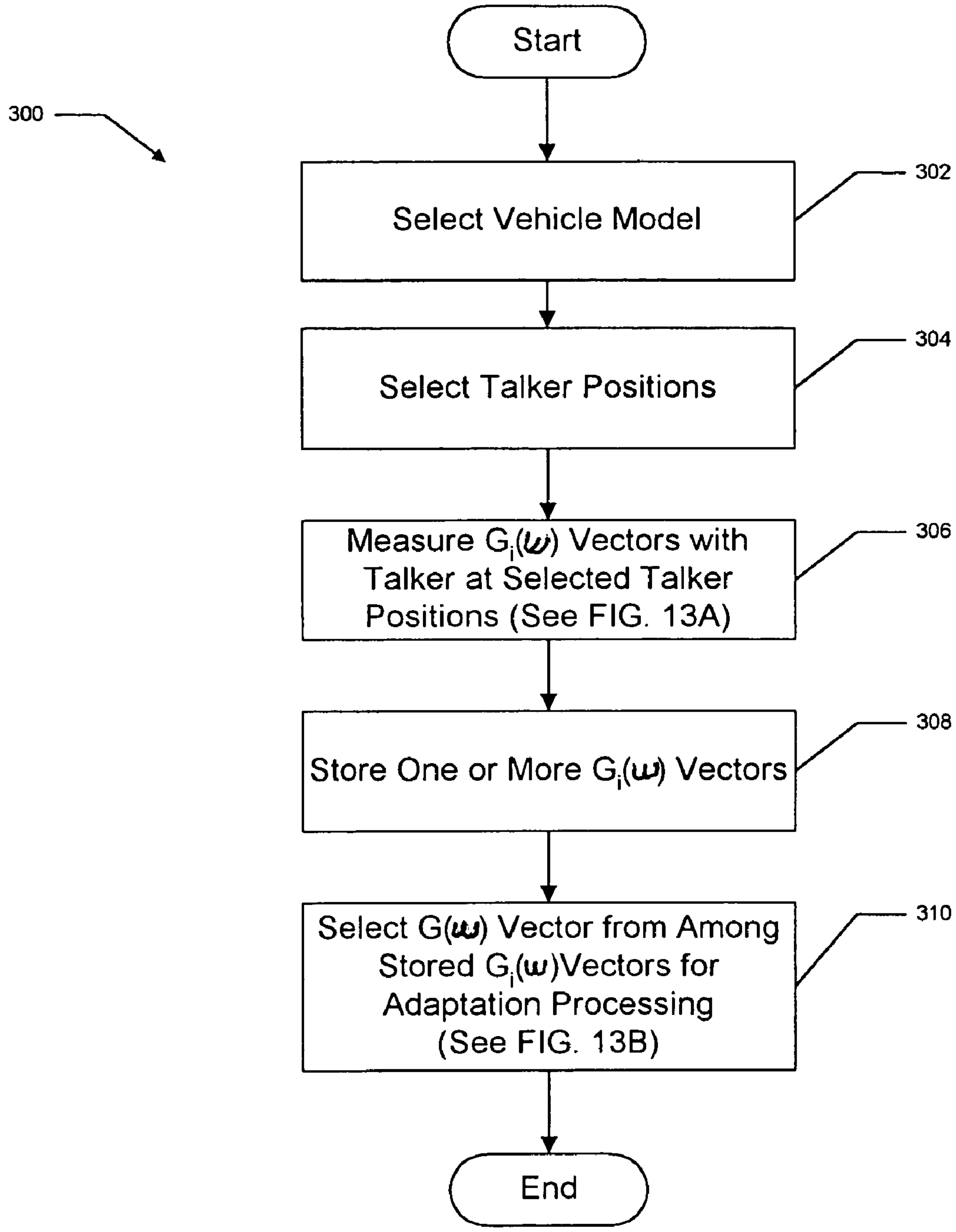
FIG. 13 is a flow chart showing a method of providing a vector having values used by an adaptation processor, which is shown, for example, as part of FIG. 5.
Figure 13A:
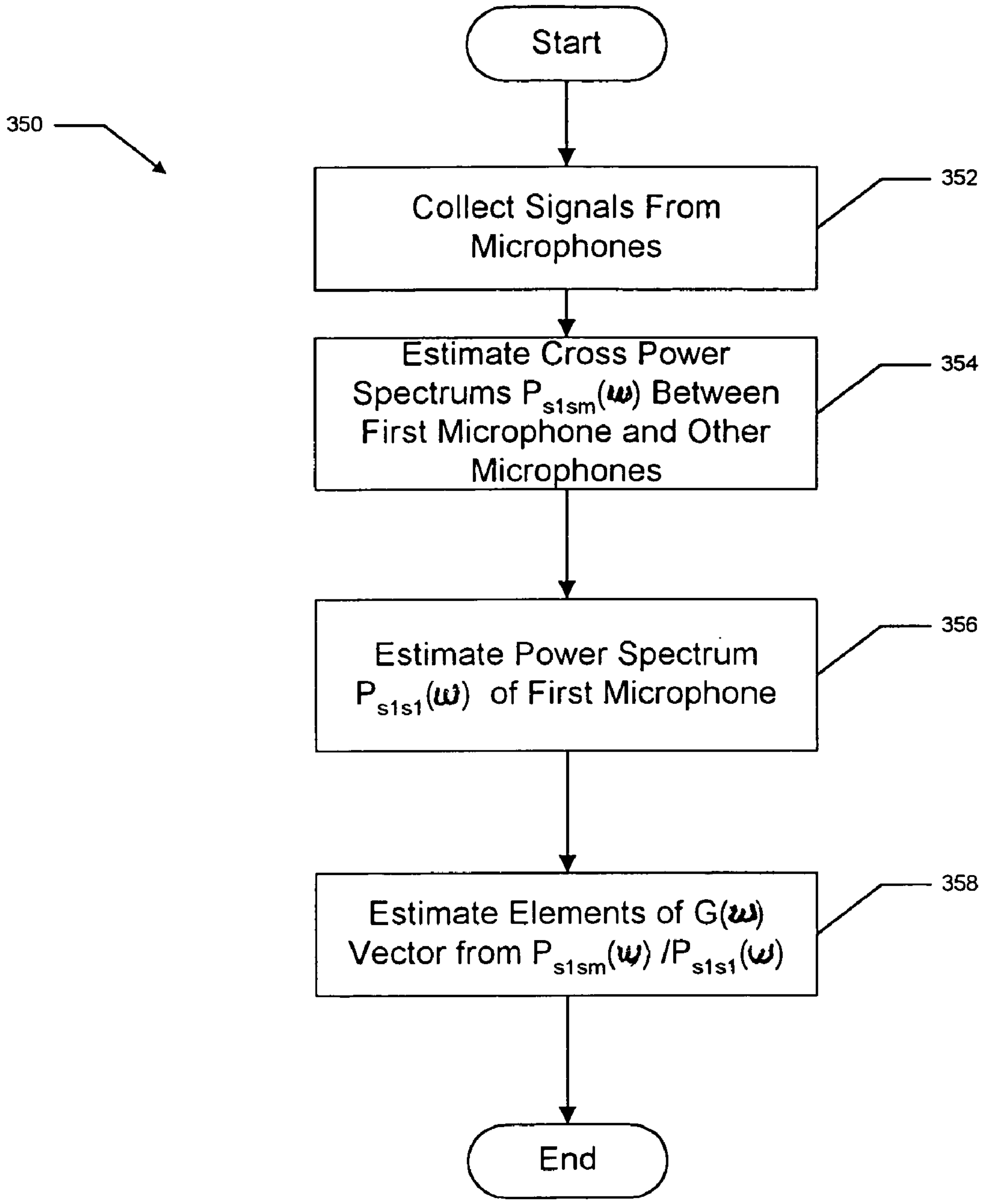
FIG. 13A is a flow chart showing further details associated with the process of FIG. 13.
Figure 13B:
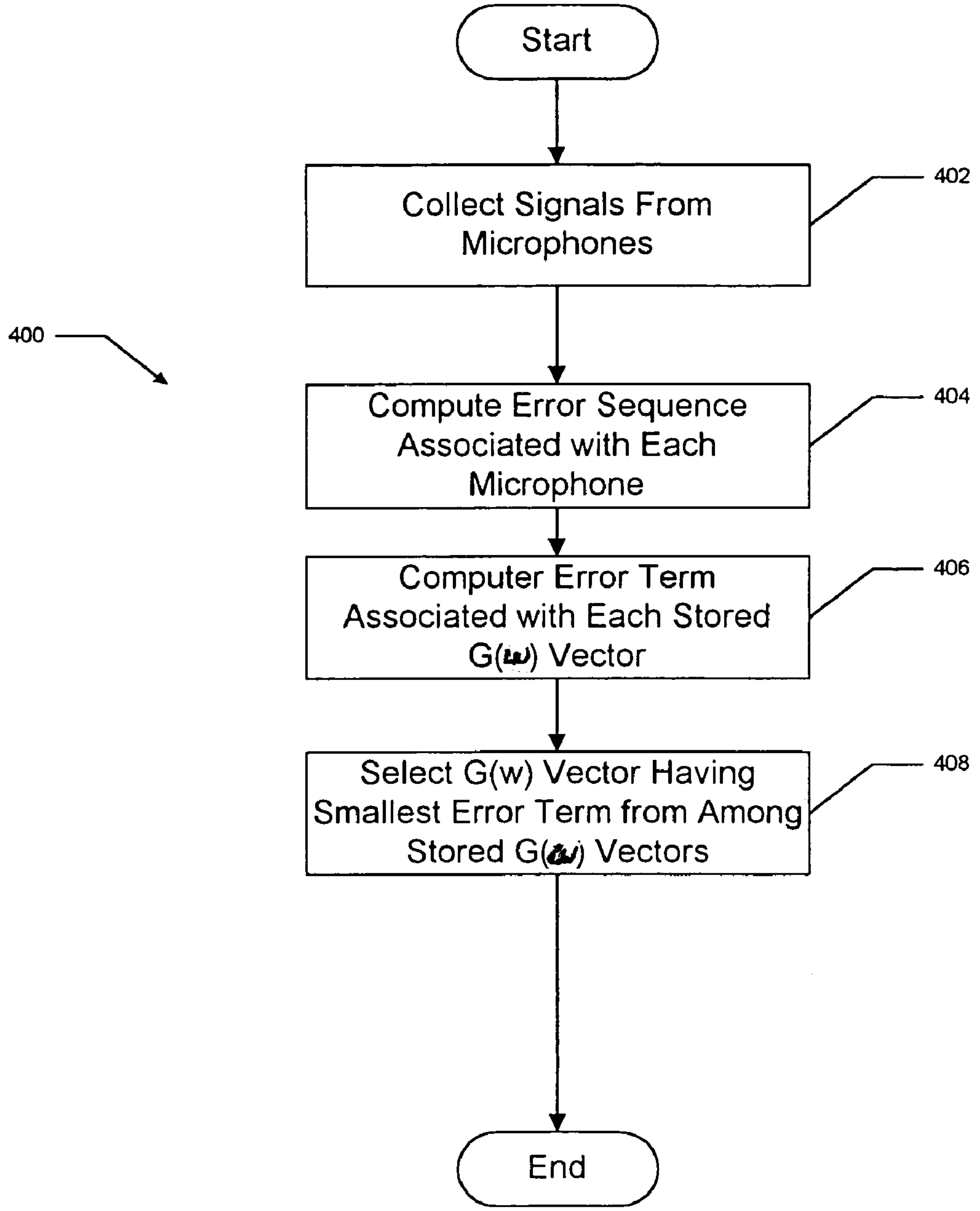
FIG. 13B is a flow chart showing yet further details associated with the process of FIG. 13.

It should be appreciated that FIGS. 13–13B show flowcharts corresponding to the below contemplated technique which would be implemented in a computer system, which, in one particular embodiment, can be a digital signal processor (e.g., 30, FIG. 2). Rectangular elements (typified by element 302 in FIG. 13), herein denoted "processing blocks," represent computer software instructions or groups of instructions. Diamond shaped elements, herein denoted "decision blocks," represent computer software instructions, or groups of instructions, which affect the execution of the computer software instructions, represented by the processing blocks.

Alternatively, the processing and decision blocks represent steps performed by functionally equivalent circuits such as an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIG. 13, a method 300 for providing a $\vec{G}(\omega)$ vector begins at block 302, where a vehicle model is selected, and within a representative one of the selected vehicle model, at block 304, talker (or user) positions are selected. The talker positions can be associated, for example, with a height of the user, and talker positions can, therefore, be selected at a variety or heights in proximity to a driver's seat. The talker positions can also be associated, for example, with the seat in which a talker is sitting, and, therefore, talker positions can be selected in proximity to the driver's seat, a passenger's seat, and various positions associated with a rear seat. In addition, vehicle configurations can be selected at the block 304. For example, windows can be up and/or down. Hereafter, when referring to talker positions, it will be recognized that vehicle configurations can also be included, though not explicitly stated.

At block 306, $\vec{G}_i(\omega)$ vectors are measured, each associated with a respective one of a plurality of talker positions. The $\vec{G}_i(\omega)$ vectors can be measured with a talker (or user) at the selected talker positions. However, in an alternate embodiment, the $\vec{G}_i(\omega)$ vectors can be measured with a sound source at the talker positions to represent a talker.

Any particular $\vec{G}_i(\omega)$ vector can be measured when a sound source is at a the i-th position and measured signals, for example, one or more of the signals from the microphones 26a–26M (FIG. 5), have a signal to noise ratio greater than a first predetermined value. For example, the $\vec{G}_i(\omega)$ vectors can be measured at a time when the signal to noise ratio is greater than about twenty decibels. A method by which the $\vec{G}_i(\omega)$ vectors can be measured is presented below in conjunction with FIG. 13A.

At block 308, one or more of the measured $\vec{G}_i(\omega)$ vectors measured at block 306 are stored, for example to a non-volatile memory, such as a flash memory. In one particular embodiment, all of the measured $\vec{G}_i(\omega)$ vectors are stored.

At block 310, one of the stored $\vec{G}_i(\omega)$ vectors is selected to be used in conjunction with adaptation processing described, for example, in conjunction with FIG. 5. A method by which one of the $\vec{G}_i(\omega)$ vectors is selected from among the stored $\vec{G}_i(\omega)$ vectors is described below in conjunction with FIG. 13B.

The blocks 302–308 can be performed, for example, during vehicle manufacture. The block 310 is dynamically performed by the system, e.g. 100, FIG. 5, when being used by a user Referring now to FIG. 13A, a method 350 of measuring each of the $\vec{G}_i(\omega)$ vectors is also described above in conjunction with FIG. 5. As described above, whenever the SNR is determined to be high and the talker is located at the i-th position relative to the microphone array, the signal processor 30 (FIG. 5) can collect the desired signal $s_1[i]$ ($s_1[i]=r_1[i]$ for high SNR) from the output of the first microphone, and the signal processor 30 can collect $s_m[i]$ ($s_m[i]=r_m[i]$ for high SNR) from the output of the m-th microphone. The signal processor 30 can then use these samples to estimate the cross power-spectrum between $s_1[i]$ and $s_m[i]$ (denoted herein as $P_{s1sm}(\omega)$). A well-known method for estimating $P_{s1sm}(\omega)$ from samples of $s_1[i]$ and $s_m[i]$ is the Welch method of spectral estimation. Recall that $P_{s1sm}(\omega)$ is the Fourier transform of:

$$\rho_{s1sm}[t]=E\{s_1[i]s_m[i+t]\};$$

therefore $P_{s1sm}(\omega)$ can be estimated.

Once $P_{s1sm}(\omega)$ is estimated, the signal processor 30 can use $P_{s1sm}(\omega)/P_{s1s1}(\omega)$ as the estimates of vector elements $G_m(\omega)$, where $P_{s1s1}(\omega)$ is the power spectrum of $s_1[i]$ obtained using a Welch method.

Therefore, at block 352, samples are collected form the microphones, (e.g., 26a–26M, FIG. 5) and at block 354, cross power spectrums, $P_{s1sm}(\omega)$, are computed. At block 356 a power spectrum, $P_{s1s1}(\omega)$, of a first microphone (reference microphone) is computed. It will be understood that the first microphone can be any one of the microphones 26a–26M.

At block 358, ratios are computed as $P_{s1sm}(\omega)/P_{s1s1}(\omega)$, providing estimates of vector elements $G_m(\omega)$ of each of the $\vec{G}_i(\omega)$ vectors.

The process 350, as described above in conjunction with FIG. 13A, can be performed, for example, during vehicle manufacture.

Referring now to FIG. 13B, a method 400 for selecting an appropriate one of the $\vec{G}_i(\omega)$ vectors stored at block 308 of FIG. 13 begins at block 402, where samples from each of a plurality of microphones, for example, microphones 26a–26M of FIG. 5, are collected. At block 404, the samples are processed. The processing provided at block 404 generates an error sequence associated with each element of each of the stored $\vec{G}_i(\omega)$ vectors.

An error sequence associated with the m-th element of $\vec{G}_i(\omega)$ can be computed as:

$$e_{m,i}[n]=r_m[n]-g_{m,i}[n]*r_1[n] \quad n=1, \ldots, N \quad m=1, \ldots, M$$

where $r_m[n]$ indicates samples from one of M microphones, index, m, is indicative of the microphone number (i.e., channel number) m=1 to M, and index, n, is indicative of samples n=1 to N;

$g_{m,i}[n]$ is a respective impulse response associated with the m-th element of the stored $\vec{G}_i(\omega)$ vectors having an index, i, indicative of one of the stored $\vec{G}_i(\omega)$ vectors, i.e., a position in a vehicle; and $r_1[n]$ indicates samples from the first one of M microphones, which is also referred to herein as a reference microphone.

At block 406, an error term is computed for each for the stored $\vec{G}_i(\omega)$ vectors. The error term associated with each one of the stored $\vec{G}_i(\omega)$ vectors can be computed as:

$$E_i = \sum_{n=1}^{N} \left(e_{2,i}^2[n] + e_{3i}^2[n] + \ldots + e_{M,i}^2[n]\right)$$

At block 408, the stored $\vec{G}_i(\omega)$ vector having the smallest error term is selected to use as the $\vec{G}(\omega)$ vector for further adaptation processing, for example, as described above in conjunction with FIG. 5.

The process 400 can be performed automatically by the system and technique of the present invention when in use by a user, allowing the $\vec{G}(\omega)$ vector used in the adaptation processing to be automatically selected.

The process 400 is dynamically performed in the presence a person talking in the automobile having a model as described above in conjunction with FIG. 13. The process 400 is performed when the person is talking, and in particular, when the signal to noise ratio of one or more of the signals provided by the microphones 26a–26M (FIG. 5) is greater than a second predetermined value, in contrast to the first predetermined value described above in conjunction with generation of the $\vec{G}_i(\omega)$ vectors. The first and second predetermined values of signal to noise ratio can be the same or different. In one particular embodiment, the second predetermined value is about twenty decibels.

The signal to noise ratio of the one or more microphone signals can be dynamically determined by the system, for example, by the system 100 of FIG. 5. In one particular embodiment, the process 400 can be provided upon a detection by the voice activity detector (V 102 (FIG. 5). In another particular embodiment, the process 400 can be provided upon a determination by the first adaptation processor 92 (FIG. 5) that one or more of the microphone signals are greater than the noise power spectrum $P_{\vec{n}\vec{n}}(\omega; k)$ by at least the second predetermined value.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

The invention claimed is:

1. A system, comprising:

a first filter portion configured to receive one or more input signals and to provide a single intermediate output signal;

a second filter portion configured to receive the single intermediate output signal and to provide a single output signal; and a control circuit configured to receive at least a portion of each of the one or more input signals and at least a portion of the single intermediate output signal and to provide information to adapt filter characteristics of the first and second filter portions, wherein the control circuit is configured to automatically select one of a plurality of stored vectors having vector elements, wherein the selected one vector is used by the control circuit to generate the information to adapt the filter characteristics wherein each one of the vector elements is associated with a transfer function between a respective one of the one or more input signals and a reference input signal from among the one or more input signals.

2. The system of claim 1, wherein the control circuit comprises a first adaptation processor for providing first information to adapt the filter characteristics of the first filter portion and a second adaptation processor for providing second information to adapt the filter characteristics of the second filter portion.

3. The system of claim 2, wherein the first information corresponds to a noise power spectral density of the one or more input signals and the second information corresponds to one or more of: a power spectral density of a noise portion of the intermediate output signal, a power spectral density of a desired signal portion of the intermediate output signal, or a power spectral density of the intermediate output signal.

4. A system, comprising:

a first filter portion configured to receive one or more input signals and to provide a single intermediate output signal;

a second filter portion configured to receive the single intermediate output signal and to provide a single output signal; and a control circuit configured to receive at least a portion of each of the one or more input signals and at least a portion of the single intermediate output signal and to provide information to adapt filter characteristics of the first and second filter portions;

at least one discrete Fourier transform (DFT) processor coupled to the first filter portion and the control circuit to receive one or more time domain signals and to provide the one or more input signals in the frequency domain to the first filter portion, and to provide the at least a portion of each of the one or more input signals in the frequency domain to the control circuit; and an interpolation processor coupled between at least one of the first filter portion and the control circuit and the second filter portion and the control circuit, to receive signal samples generated by the control circuit having a first frequency separation, to interpolate the signal samples generated by the control circuit, and to provide interpolation signal samples to at least one of the first filter portion and the second filter portion, having a frequency separation less than the frequency separation of the signal samples generated by the control circuit, wherein the control circuit comprises a first adaptation processor for providing first information to adapt the filter characteristics of the first filter portion and a second adaptation processor for providing second information to adapt the filter characteristics of the second filter portion, and wherein the first information corresponds to a noise power spectral density of the one or more input signals and the second information corresponds to one or more of a power spectral density of a noise portion of the intermediate output signal, a power spectral density of a desired signal portion of the intermediate output signal, or a power spectral density of the intermediate output signal.

5. A method for processing one or more microphone signals provided by one or more microphones associated with a vehicle, comprising:

selecting a vehicle model;

selecting one or more positions within a vehicle having the vehicle model;

measuring a respective one or more response vectors with an acoustic source positioned at selected ones of the one or more positions, wherein each of the one or more response vectors has respective vector elements, and wherein each one of the one or more response vectors is representative of a transfer function between a respective one of the one or more microphone signals and a reference microphone signal from among the one or more microphone signals;

storing the one or more response vectors;

selecting one of the stored response vectors; and adapting a first filter portion and a second filter portion in accordance with the selected response vector.

6. The method of claim 5, wherein the measuring a respective one or more response vectors comprises:

collecting the one or more respective microphone signals at selected ones of the one or more positions;

estimating a plurality of cross power spectrums between each of the one or more microphone signals and a reference one of the one or more microphone signals for each of the one or more positions;

estimating a reference power spectrum of the reference one of the one or more microphone signals for each of the one or more positions; and estimating a respective plurality of vector elements for each of the one or more response vectors, each vector element a ratio of a respective one of the plurality of cross power spectrums and the reference power spectrum.

7. The method of claim 5, wherein the selecting one of the stored response vectors comprises:

computing a respective error sequence associated with each element of each one of the stored one or more response vectors;

computing a respective error term associated with each one of the stored one or more response vectors in accordance with the computing a respective error sequence; and selecting a response vector from among the stored one or more response vectors, wherein the selected response vector has a smallest respective error term.

8. The method of claim 7, wherein the selecting the response vector from among the stored one or more response vectors is performed at a time when at least one of the one or more microphone signals has a signal to noise ratio greater than a second predetermined value.

9. The method of claim 5, wherein the adapting the first filter portion and the second filter portion comprises:

adapting a response of the first filter portion in response to a noise portion of the one or more microphone signals and adapting a response of the second filter portion in response to a power spectral density of at least one of a noise portion of an output from the first filter portion, a desired signal portion of the output from the first filter portion, and characteristics of the output from the first filter portion.

10. The method of claim 5, wherein the measuring the respective one or more response vectors is performed at a time when at least one of the one or more microphone signals has a signal to noise ratio greater than a predetermined value.

11. The method of claim 5, wherein the selecting one of the stored response vectors is performed at a time when at least one of the one or more microphone signals has a signal to noise ratio greater than a predetermined value.

* * * * *